United States Patent
Matsuda et al.

(10) Patent No.: US 7,492,547 B2
(45) Date of Patent: Feb. 17, 2009

(54) CARTRIDGE DEVICE WITH AN EJECTION SLIDER HAVING A PROJECTION INSERTABLE INTO A POSITIONING RECESS

(75) Inventors: Mikinori Matsuda, Kanagawa (JP); Kazuhito Kurita, Kanagawa (JP); Takahiro Yamada, Saitama (JP); Tokio Kanada, Kanagawa (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 11/355,901

(22) Filed: Feb. 17, 2006

(65) Prior Publication Data
US 2006/0198046 A1 Sep. 7, 2006

(30) Foreign Application Priority Data
Mar. 3, 2005 (JP) ............... 2005-059043

(51) Int. Cl.
*G11B 17/04* (2006.01)
(52) U.S. Cl. ............ 360/99.06; 720/633; 720/641
(58) Field of Classification Search .......... 360/99.06, 360/99.02, 99.03, 99.07; 720/633, 641, 634, 720/635
See application file for complete search history.

(56) References Cited

U.S. PATENT DOCUMENTS

| | | | |
|---|---|---|---|
| 6,272,092 B1 * | 8/2001 | Arai et al. | 720/635 |
| 7,088,643 B2 * | 8/2006 | Igarashi et al. | 369/13.21 |
| 2003/0048732 A1 * | 3/2003 | Inata et al. | 369/77.2 |
| 2004/0004865 A1 * | 1/2004 | Kanada et al. | 365/200 |

FOREIGN PATENT DOCUMENTS

| | | |
|---|---|---|
| JP | 62-142757 | 9/1987 |
| JP | 04-276352 | 10/1992 |
| JP | 09-012766 | 1/1994 |
| JP | 06-302083 | 10/1994 |
| JP | 06-084541 | 12/1994 |
| JP | 10-208359 | 8/1998 |
| JP | 11-185342 | 7/1999 |
| JP | 11-232865 | 8/1999 |
| JP | 2000-156010 | 6/2000 |
| JP | 2001-084674 | 3/2001 |
| JP | 2001-160249 | 6/2001 |
| JP | 2002-100101 | 4/2002 |
| JP | 2002-343008 | 11/2002 |
| JP | 2003-288750 | 10/2003 |
| JP | 2005-050463 | 2/2005 |
| WO | WO 02/01557 | 1/2002 |

* cited by examiner

*Primary Examiner*—Jefferson Evans
(74) *Attorney, Agent, or Firm*—Oblon, Spivak, McClelland, Maier & Neustadt, P.C.

(57) ABSTRACT

A cartridge device has a recording and reproducing unit for recording an information signal on and/or reproducing an information signal from a recording medium of a recording medium cartridge, the case having a positioning hole. A chassis of the device has a base and a projection projecting from the base toward a holder for being inserted in the positioning hole. An ejection slider is slidably supported on the chassis for sliding movement selectively in a first sliding direction to move the holder from the first to second position and a second sliding direction, which is opposite to the first sliding direction, to move the holder from the second to first position. The projection has a recess defined therein. The ejection slider has a portion insertable into the recess when the election slider is moved in the first sliding direction.

5 Claims, 39 Drawing Sheets

CARTRIDGE DEVICE WITH AN EJECTION SLIDER HAVING A PROJECTION INSERTABLE INTO A POSITIONING RECESS

CROSS REFERENCES TO RELATED APPLICATIONS

The present invention contains subject matter related to Japanese Patent Application JP 2005-059043, JP 2005-059048, JP 2005-059049, JP 2005-059044, JP 2005-059045, JP 2005-059046, and JP 2005-059047 each filed in the Japanese Patent Office on Mar. 3, 2005, the entire contents of which being incorporated herein by reference.

BACKGROUND OF THE INVENTION

The present invention relates to a cartridge device for use as a recording medium drive unit in an electronic device, and more particularly to a cartridge device for use as a recording medium drive unit which comprises an assembly of a chassis and an ejection slider slidably supported on the chassis, the assembly being designed for allowing the chassis and the ejection slider to be assembled together with higher efficiency.

There have been recording medium drive units for recording an information signal on and/or reproducing an information signal from a recording medium housed in a case, e.g., a disk-shaped recording medium rotatably housed in a recording medium cartridge.

Some recording medium drive units have a holder for holding a recording medium cartridge, an ejection slider slidably supported on the holder, and an ejection lever angularly movably supported on a chassis. The ejection lever and the ejection slider operate in ganged relation to each other. For details, reference should be made to Japanese Patent Laid-open No. 2002-343009, for example.

When a recording medium cartridge is inserted into the holder, the recording medium cartridge turns the ejection lever in a first turning direction, moving the ejection slider in a first sliding direction. The movement of the ejection slider causes the holder to move into contact with the chassis. A recording medium housed in the recording medium cartridge which is held by the holder is placed on a disk table, whereupon the loading process is completed.

The recording medium cartridge is ejected as follows: When the ejection slider is moved in a second sliding direction which is opposite to the first sliding direction, the holder is displaced away from the chassis to release the recording medium from the disk table. The movement of the ejection slider in the second sliding direction angularly moves the ejection lever in a second turning direction which is opposite to the first turning direction. The ejection lever now pushes the recording medium cartridge out of holder.

The above recording medium drive units are required to position the ejection slider and the ejection lever in alignment with each other for loading and ejecting the recording medium cartridge properly. Since the ejection slider is supported on the holder, the holder on which the ejection slider is supported is assembled on the chassis to keep the ejection slider and the ejection lever in positional alignment with each other.

In the recording medium drive units, after the ejection slider and the ejection lever have been positionally aligned with each other, various adjustments need to be made which include a skew adjustment for an optical pickup for recording an information signal on and reproducing an information signal from the recording medium. Because the holder has already been assembled on the chassis, it is necessary to insert a jig or the like from the holder to perform the adjustments. Therefore, the existence of the holder makes the adjustments difficult to perform or tedious and time-consuming.

One solution would be to form a large hole in the holder for the insertion of the jig therethrough. However, the large hole in the holder tends to reduce the mechanical strength of the holder and also to make the shape of the holder complex, resulting in an increase in the cost of the recording medium drive units.

SUMMARY OF THE INVENTION

It is desirable for the present invention to provide a cartridge device for use as a recording medium drive unit which has components designed for themselves to be assembled together with higher efficiency.

To achieve the above desire, there is provided in accordance with the present invention a cartridge device including a recording and reproducing unit for recording an information signal on and/or reproducing an information signal from a recording medium stored in a case of a recording medium cartridge, the case having a positioning hole, a holder for holding the recording medium cartridge inserted therein, the holder being movable between a first position in which the recording medium cartridge can be inserted into and removed from the holder and a second position in which an information signal can be recorded on or reproduced from the recording medium by the recording and reproducing unit, a chassis having a base on which the recording and reproducing unit is mounted and a projection projecting from the base toward the holder for being inserted in the positioning hole, the holder being movably supported on the chassis for movement between the first position and the second position, and an ejection slider slidably supported on the chassis for sliding movement selectively in a first sliding direction to move the holder from the first position to the second position and a second sliding direction, which is opposite to the first sliding direction, to move the holder from the second position to the first position, wherein the projection has a recess defined therein, in which the ejection slider has a portion insertable into the recess when the election slider is moved in the first sliding direction.

The chassis may have a pair of side walls projecting from respective opposite side edges of the base in a direction transverse to the base, and the ejection slider may have a pair of side plates slidable against the side walls, respectively, and a bridge interconnecting the side plates. The bridge is slidable against the base. When the ejection slider is moved in the first sliding direction, at least a portion of the bridge is inserted into the recess.

The portion of the bridge comprises a thin portion which is thinner than the remaining portion of the bridge, the thin portion being inserted into the recess.

The cartridge device may further include an insertion slot for inserting the recording medium cartridge therein, wherein the projection being disposed near the insertion slot. When the ejection slider is moved toward the insertion slot, the portion of the ejection slider is inserted into the recess.

The projection may comprise two projections mounted on the chassis.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

A cartridge device according to an embodiment of the present invention is typically used as a recording medium cartridge for use in a recording medium drive unit in an electronic device. In the illustrated embodiment, the electronic device includes a portable game device, and the recording medium drive unit includes a disk drive in the portable game device.

However, the electronic device and the recording medium drive unit are not limited to a portable game device and a disk drive in the portable game device. The electronic device may be any of various other electronic devices employing recording mediums, e.g., an information processing device such as a personal computer or the like, a communication device such as a telephone set, a facsimile device, or the like, an information terminal device such as a PDA (Personal Digital Assistant) or the like, an image capturing device such as a still camera, an electronic camera, a video camera, or the like, an audiovisual device such as a television, a radio, or the like, and a recording device or an acoustic device employing a recording medium employing any of various recording mediums including a tape cassette, a magnetic disk, an optical disk, etc. The recording medium drive unit may be any of various other drives for recording an information signal on and reproducing an information signal from recording mediums employed by various electronic devices referred to above.

The recording medium cartridge will first be described below with reference to FIGS. 1 through 5.

Figure 1:
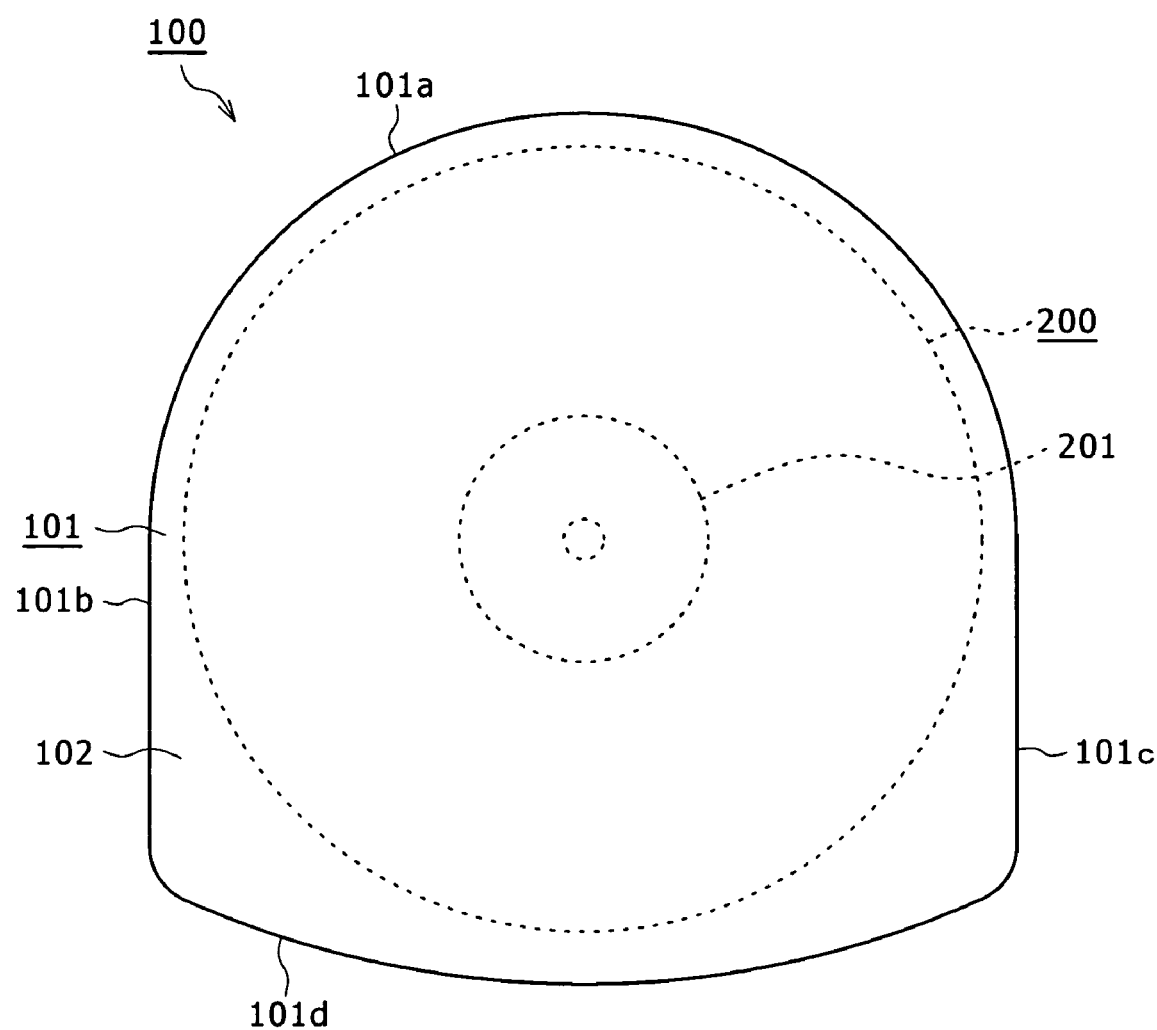
FIG. 1 is an enlarged plan view of a recording medium cartridge.
Figure 2:
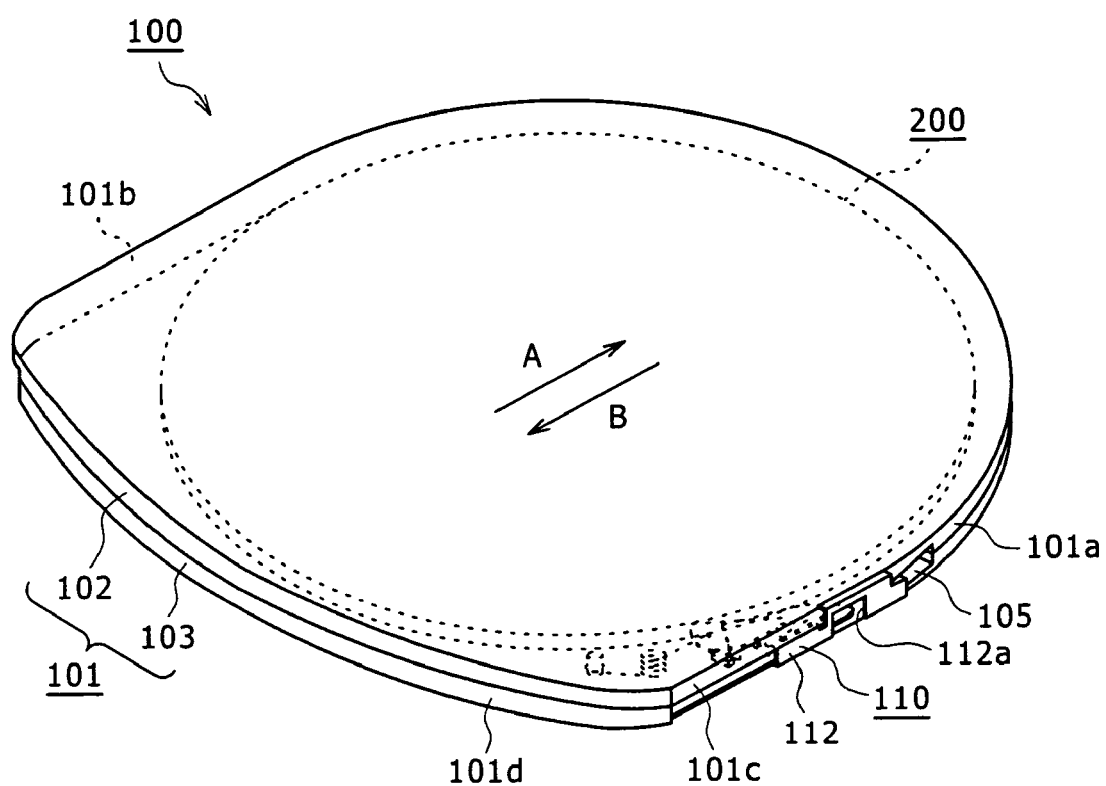
FIG. 2 is an enlarged perspective view of the recording medium cartridge, showing a front side thereof.

As shown in FIGS. 1 and 2, the recording medium cartridge, generally denoted by 100, comprises a disk-shaped recording medium 200 rotatably housed in a flat case 101 thereof.

The case 101 comprises an upper shell 102 and a lower shell 103 which are connected to each other, as shown in FIG. 2. The case 101 has a half portion oriented in the direction indicated by the arrow A in FIG. 2, the half portion being of a substantially semicircular shape and having an arcuate peripheral surface 101a. The case 101 is inserted into a holder, to be described later, in the direction indicated by the arrow A. The case 101 has an opposite half portion oriented in the direction indicated by the arrow B which is opposite to the direction indicated by the arrow A. The opposite half portion extends laterally and has a pair of laterally spaced side surfaces 101b, 101c extending contiguously to the ends of the arcuate peripheral surface 101a. The opposite half portion also has a convex peripheral end surface 101d extending between and interconnecting the ends of the side surfaces 101b, 101c which are remote from the side surfaces 101b, 101c.

The case 101 has an insertion slot 105 (see FIGS. 2 and 3) defined in a peripheral surface thereof which extends from the right side surface 101c to the arcuate peripheral surface 101a. As shown in FIG. 4, the case 101 also has an engagement groove 101e defined in the right side surface 101c positioned above the insertion slot 105 and extending in the directions indicated by the arrows A, B.

Figure 3:
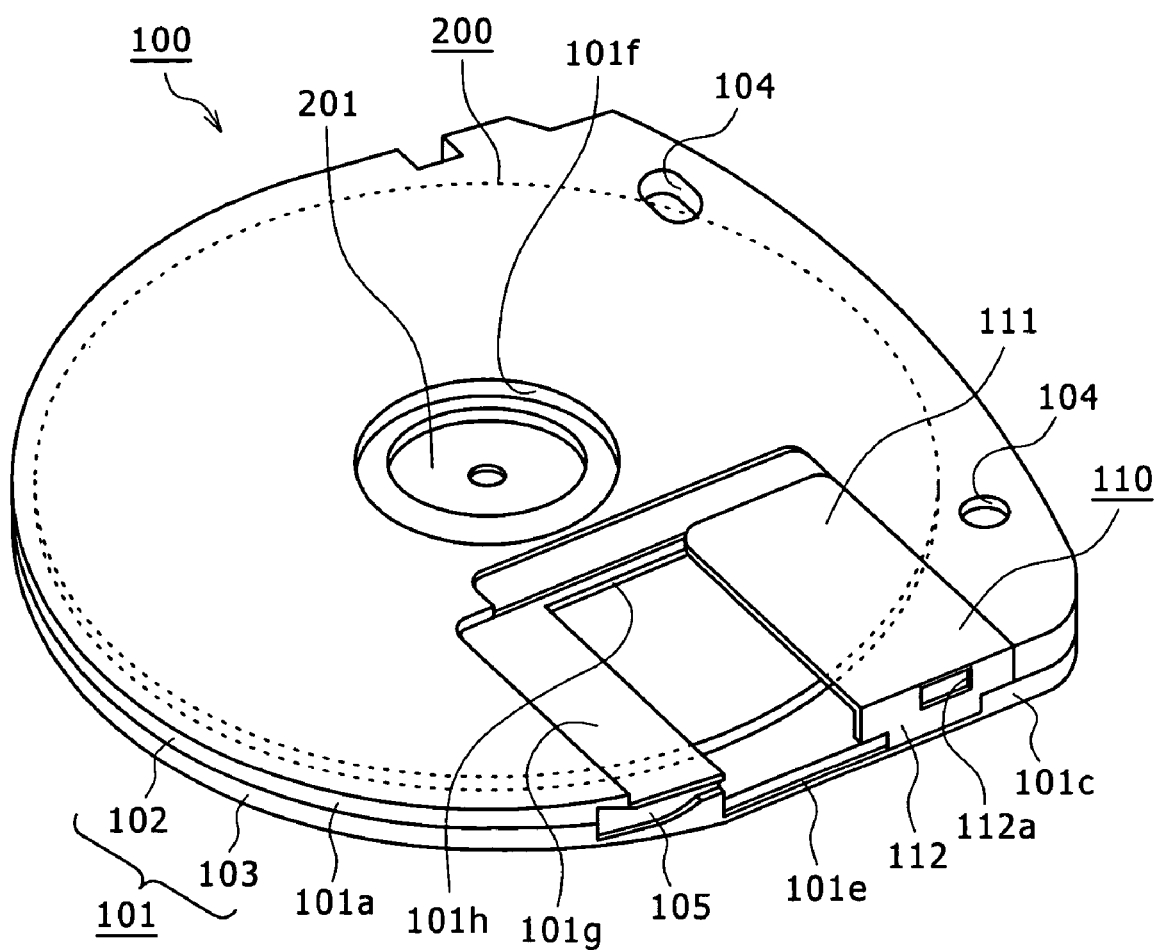
FIG. 3 is an enlarged perspective view of the recording medium cartridge, showing a rear side thereof.
Figure 4:
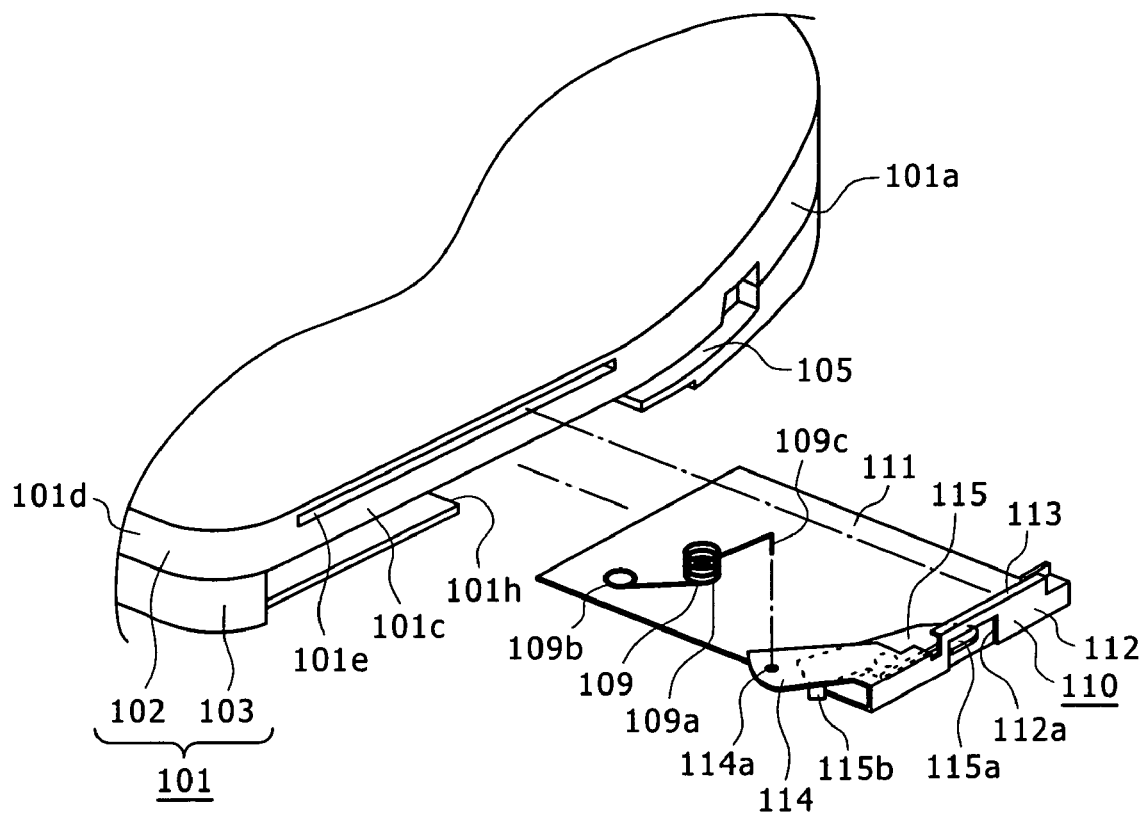
FIG. 4 is an enlarged exploded perspective view of a portion of the recording medium cartridge.
Figure 5:
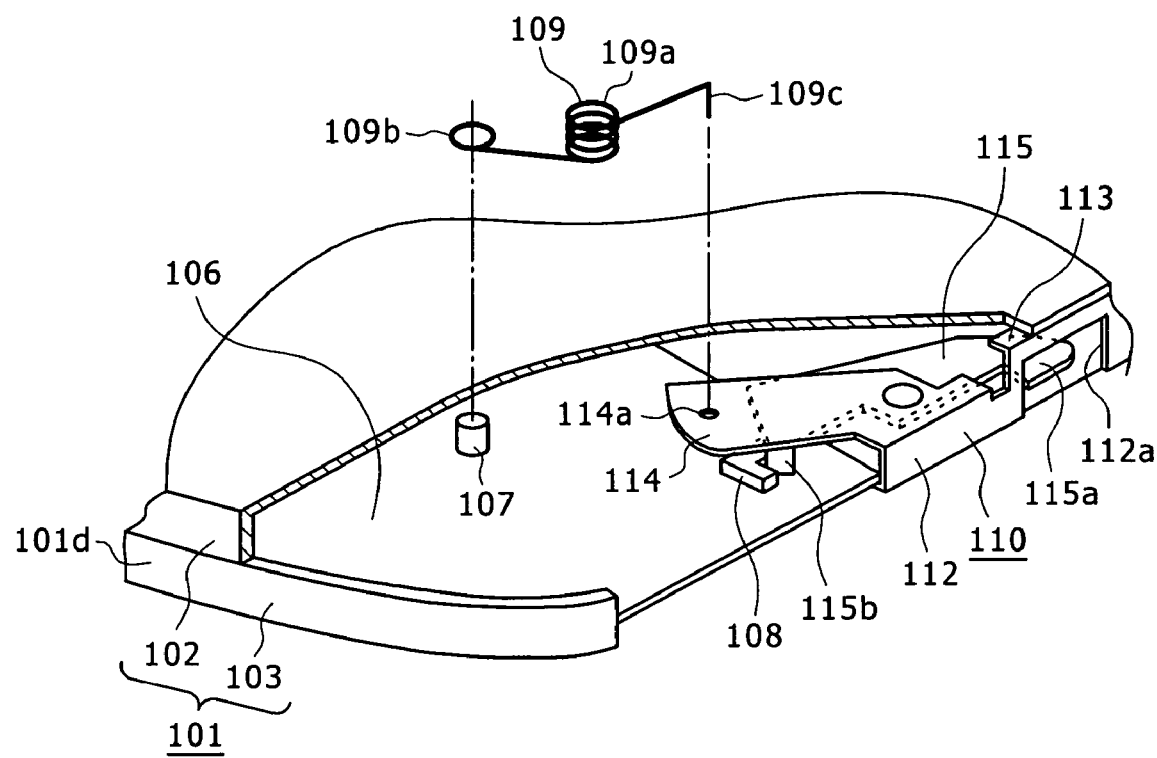
FIG. 5 is an enlarged perspective view, partly cut away, of a portion of the recording medium cartridge.

As shown in FIG. 3, the case 101 has a table insertion hole 101f defined centrally in the lower surface of the lower shell 103, and a shallow slide recess 101g defined in the lower surface of the lower shell 103 radially outwardly of the table insertion hole 101f on the right-hand side thereof. The case 101 has a light transmission hole 101h defined partly in the shallow slide recess 101g for transmitting therethrough a laser beam that is emitted from a light emitter of an optical pickup (to be described later).

The lower shell 103 has a pair of laterally spaced positioning holes 104 defined in the lower surface thereof near the convex peripheral end surface 101d.

The opposite half portion of the case 101 has a pair of laterally spaced left and right hollow regions which are positioned radially outwardly of the recording medium 200. The right hollow region serves as a mechanism housing region 106 (see FIG. 5) which accommodates therein a spring retainer shaft 107 and a locking finger 108.

A toggle spring 109 is supported in the mechanism housing region 106. The toggle spring 109 comprises a coil 109a, a first arm 109b projecting radially outwardly from an end of the coil 109a, and a second arm 109c projecting radially outwardly from the other end of the coil 109a. The first arm 109b has a distal end supported on the spring retainer shaft 107.

A shutter 110 is slidably supported in the case 101. The shutter 110 is of a unitary structure made of a metal plate. As shown in FIG. 4, the shutter 110 comprises a substantially rectangular opening and closing panel 111 having the largest size of all the members of the shutter 110, a side wall 112 projecting upwardly from a right side edge of the opening and closing panel 111, an engaging flange 113 projecting leftwards from a portion of the side wall 112, except longitudinally opposite end portions thereof, and a support tongue 114 projecting leftwards from one of the longitudinally opposite end portions of the side wall 112.

The side wall 112 has an acting hole 112a defined therein. The support tongue 114 has a spring engaging hole 114a defined in a distal end portion thereof. An elongate lock lever 115 is angularly movably supported on the lower surface of the support tongue 114. The engaging lock lever 115 has a substantially longitudinally central portion thereof pivotally supported on the support tongue 114 and a pair of longitudinally opposite ends disposed one on each side of the pivotally supported substantially longitudinally central portion. One of the longitudinally opposite ends of the engaging lock lever 115 serves as a pressed member 115a, and the other as an engaging tooth 115b projecting downwardly. The engaging lock lever 115 is normally urged by a spring, not shown, to move in a direction to have the pressed member 115a projecting from the acting hole 112a in the side wall 112.

The shutter 110 is slidably supported in the case 101 such that the opening and closing panel 111 is supported in the slide recess 101g, the side wall 112 is supported on the side surface 101c, and the engaging flange 113 is slidably supported in engaging groove 101e defined in the side surface 101c. With the shutter 110 supported in the case 101, the distal end of the second arm 109c of the toggle spring 109 engages in the spring engaging hole 114a defined in the support tongue 114.

The shutter 110 slides with respect to the case 101 between a closed position in which the opening and closing panel 111 closes the light transmission hole 101h and an open position in which the opening and closing panel 111 opens the light transmission hole 101h.

When the shutter 110 is in the closed position, the shutter 110 is urged by the toggle spring 109 to move in the direction indicated by the arrow A in FIG. 2, and is held in the closed position. At this time, the lock lever 115 supported on the support tongue 114 of the shutter 110 engages the locking finger 108 under the bias of the non-illustrated spring (see FIG. 5), locking the shutter 110 in the closed position. The pressed member 115a of the lock lever 115 is positioned in the acting hole 112a defined in the side wall 112.

Conversely, when the shutter 110 is in the open position, the shutter 110 is urged by the toggle spring 109 to move in the direction indicated by the arrow B in FIG. 2, and is held in the open position.

As shown in FIG. 3, the recording medium 200 housed in the case 101 has a core 201 mounted centrally thereon. The core 201 is made of a magnetic metal material. The core 201 is positioned in alignment with the table insertion hole 101f defined in the case 101.

Specific structural details of the electronic device will be described below.

Figure 6:
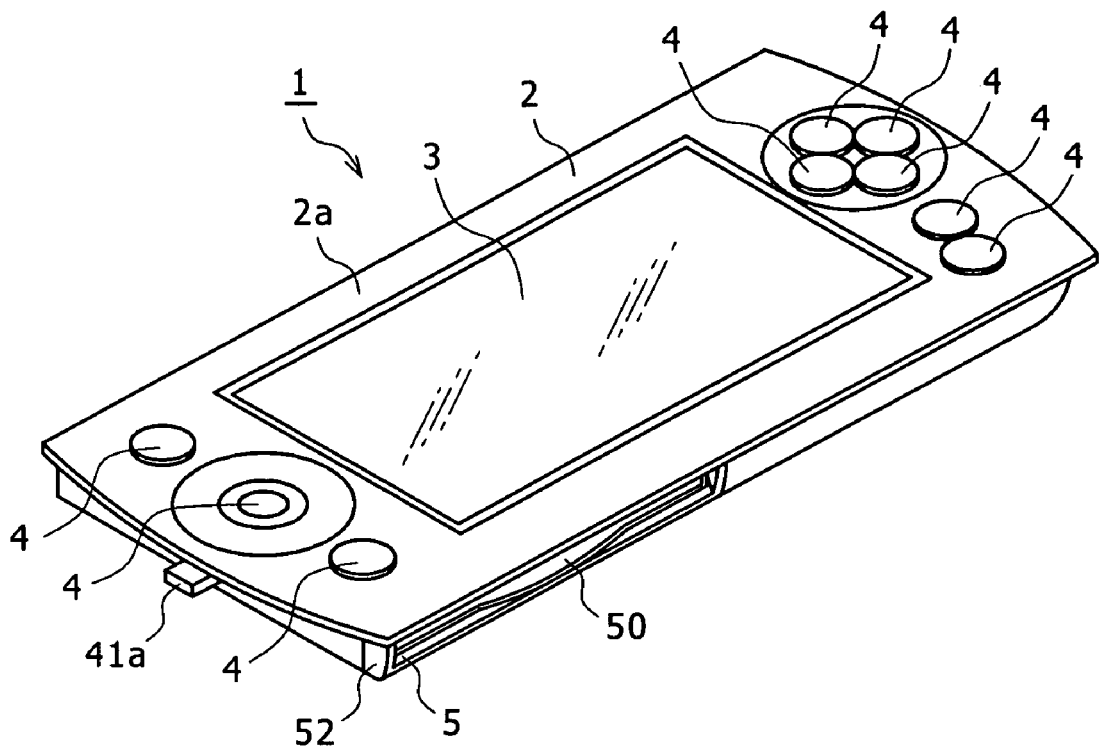
FIG. 6 is a perspective view of an electronic device, showing a front side thereof.
Figure 7:
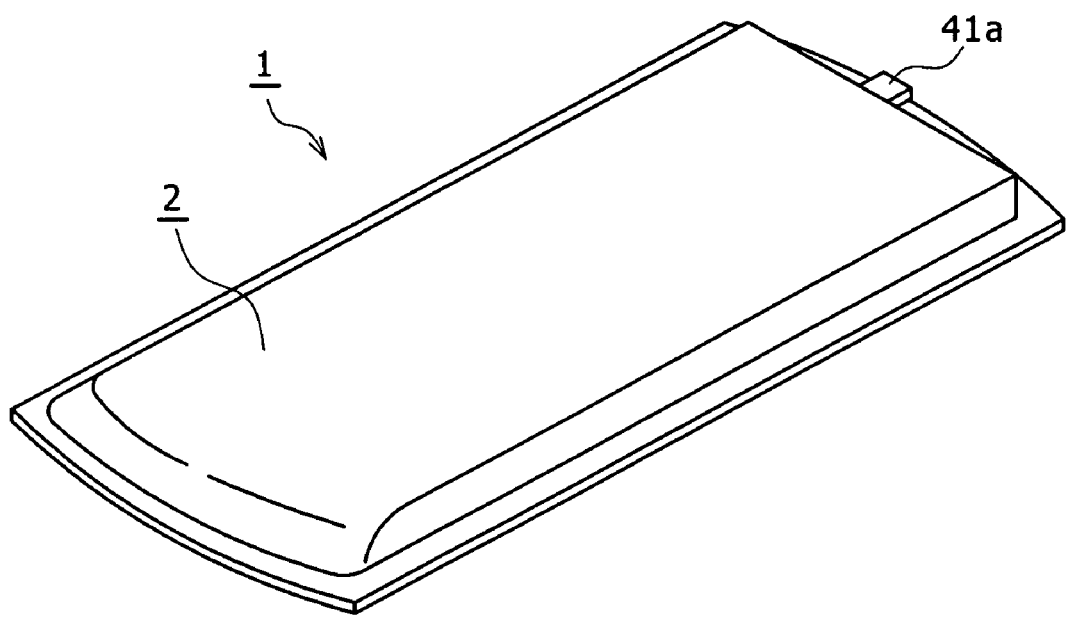
FIG. 7 is a perspective view of the electronic device, showing a rear side thereof.

As shown in FIGS. 6 and 7, the electronic device, generally denoted by 1, is of a flat elongate shape and includes an outer housing 2 accommodating various components.

The outer housing 2 has a front panel 2a with a display unit 3 disposed centrally thereon. As shown in FIG. 6, a plurality of control keys 4 are disposed oh left and right opposite end portions of the front panel 2a of the outer housing 2. The outer housing 2 also has an insertion slot 5 defined in a lower portion thereof for the insertion of the recording medium cartridge 100 therein.

Figure 8:
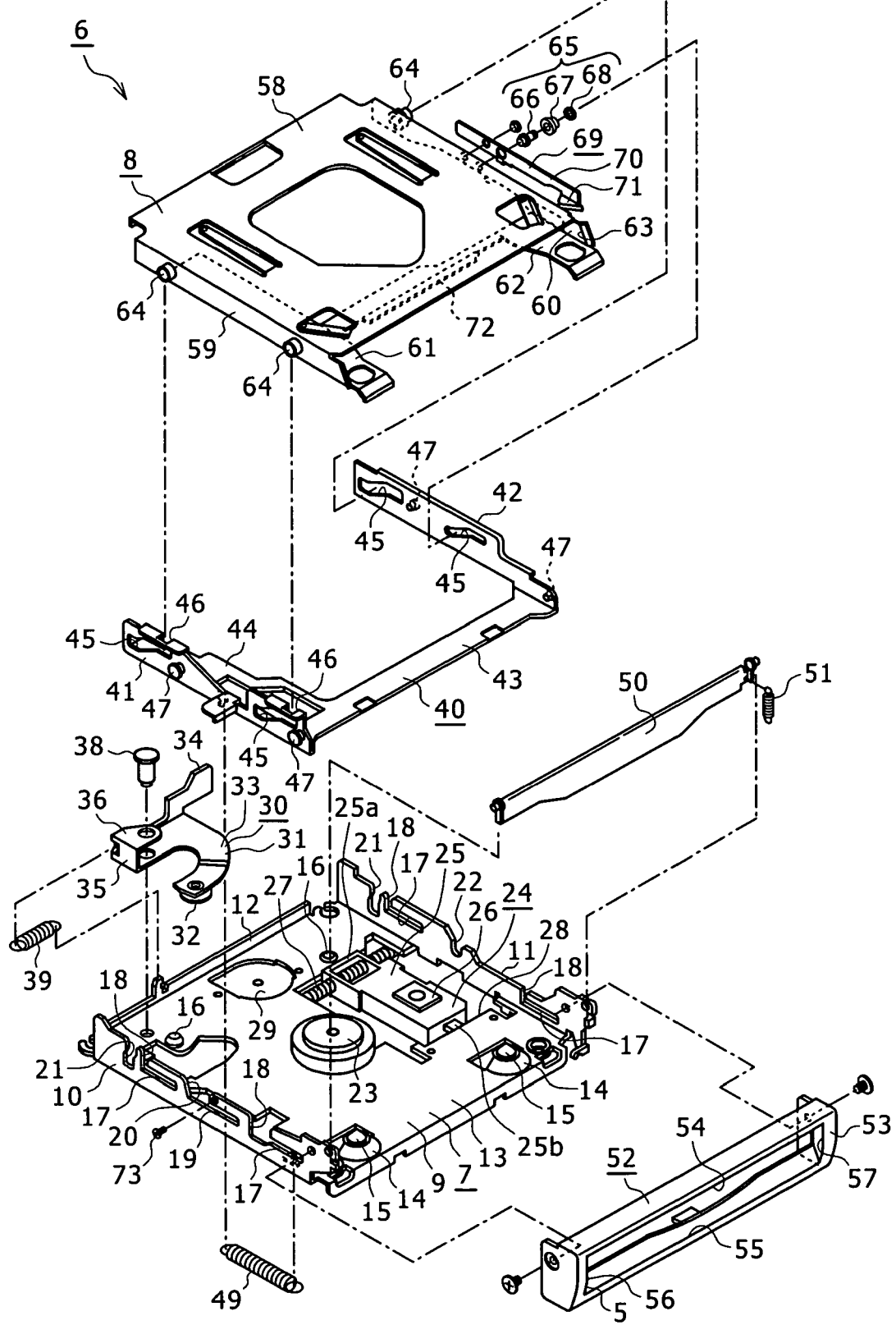
FIG. 8 is an exploded perspective view of a recording medium drive unit.
Figure 9:
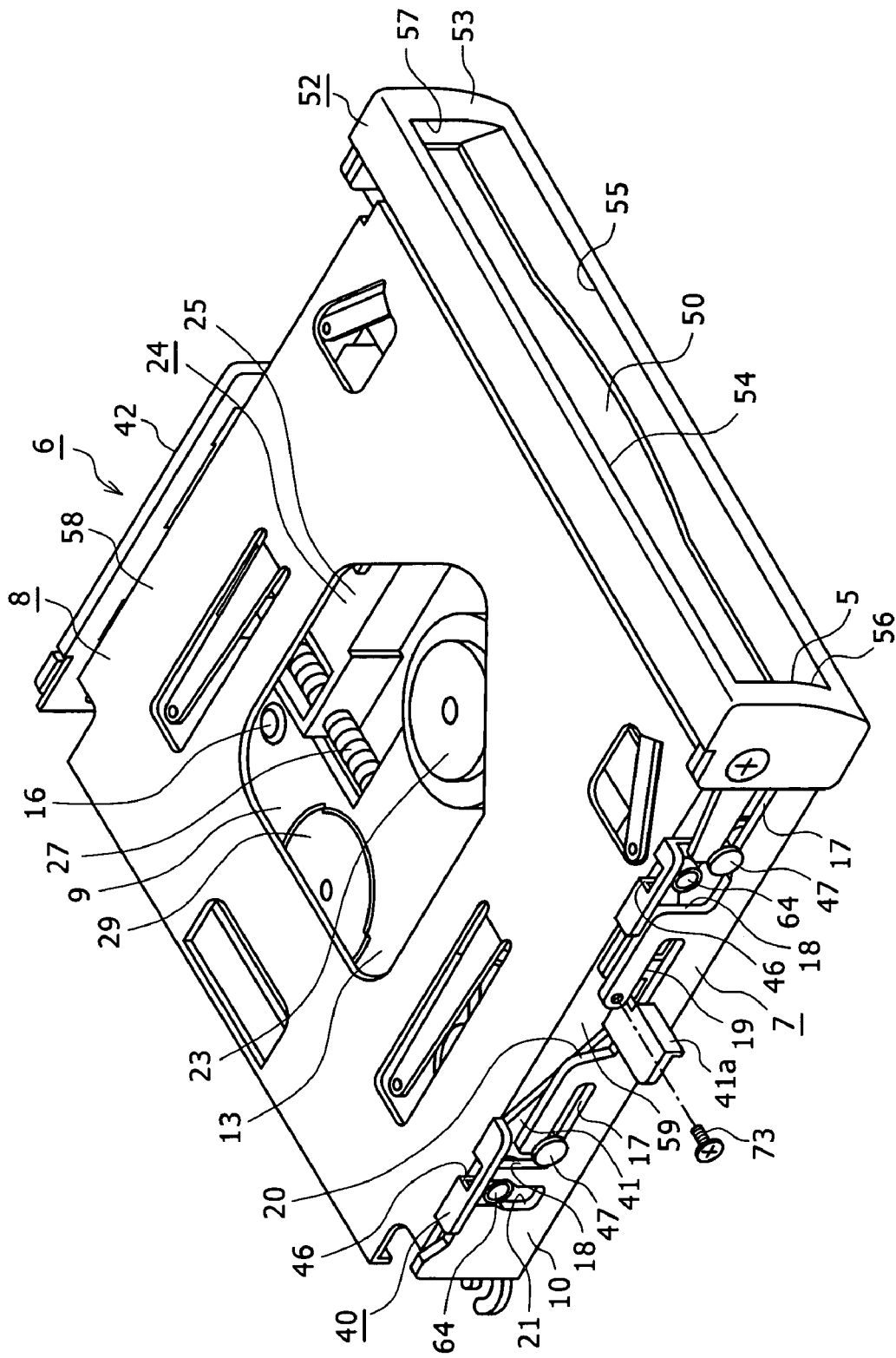
FIG. 9 is an enlarged perspective view of the recording medium drive unit.

The outer housing 2 houses therein a recording medium drive unit (disk drive) 6 (see FIGS. 8 and 9). The recording medium drive unit 6 comprises a chassis 7, various components disposed or supported on the chassis 7, a holder 8 movably supported on the chassis 7, and various circuits including a drive circuit which are mounted on the chassis 7.

For the sake of convenience, the direction in which the recording medium cartridge 100 is inserted into the holder 8 will be referred to as a rearward direction, the direction in which the inserted recording medium cartridge 100 is removed from the holder 8 as a forward direction, the position of the holder 8 as an upper position, and the position of the chassis 7 as a lower position.

Figure 10:
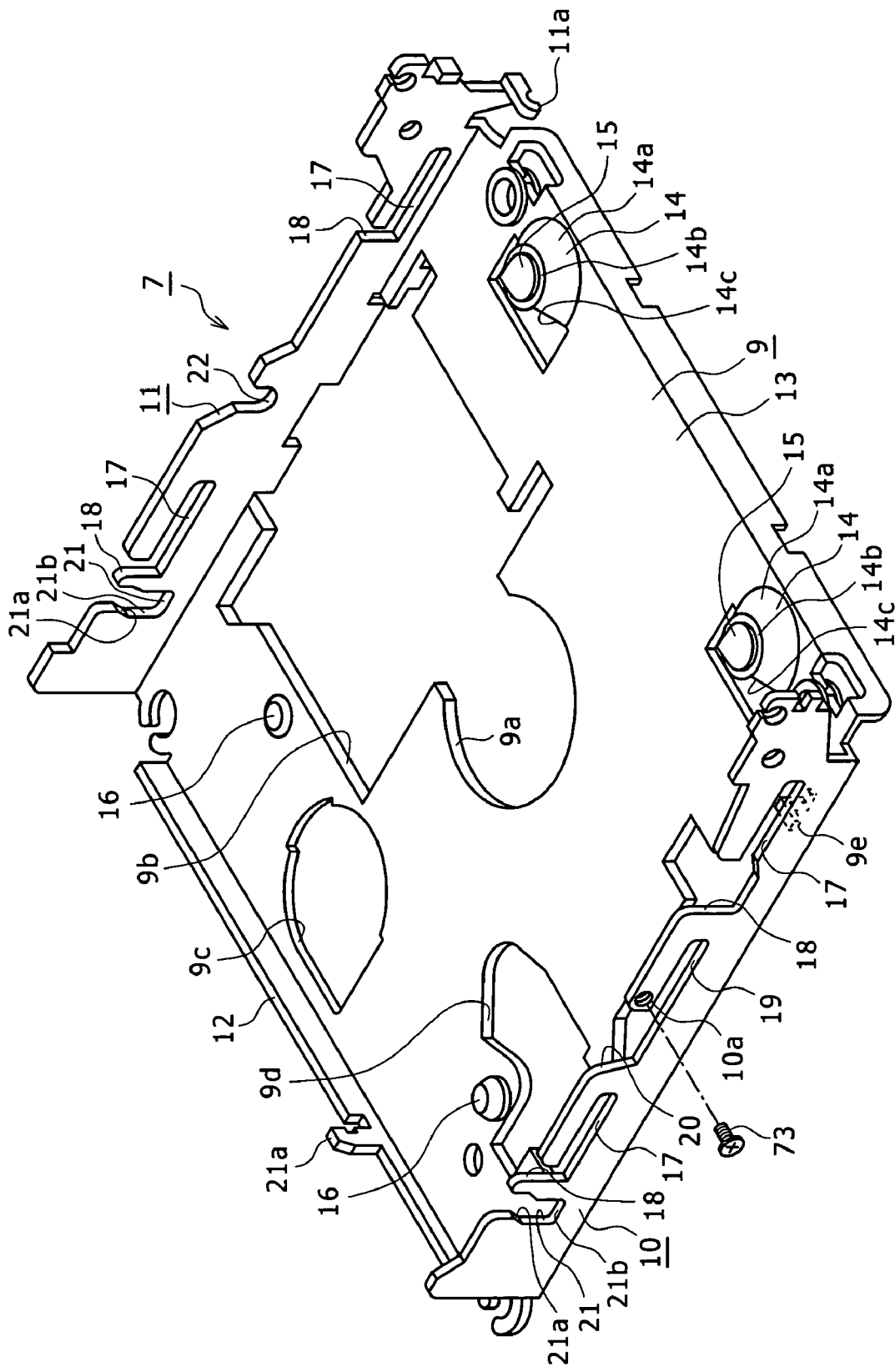
FIG. 10 is an enlarged perspective view of a chassis of the recording medium drive unit.

The chassis 7 is of a unitary structure made of a metal plate. As shown in FIG. 10, the chassis 7 comprises a substantially square base 9, a pair of side walls 10, 11 projecting upwardly from respective left and right side edges of the base 9, and a rear wall 12 projecting upwardly from a rear edge of the base 9. The side walls 10, 11 are higher than the rear wall 12.

The base 9 has a table placement hole 9a defined centrally therein and a pickup placement hole 9b defined therein on the right-hand side of table placement hole 9a contiguously to the table placement hole 9a. The base 9 also has a motor placement hole 9c defined in a rear end portion thereof and a placement hole 9d defined in a left end portion thereof near the rear end of the base 9. A downwardly projecting spring retainer finger 9e is disposed on the left end portion of the base 9 near the front end of the base 9.

The base 9 comprises a flat panel 13 and a pair of pin placement regions 14 projecting upwardly from the flat panel 13. The pin placement regions 14 are disposed respectively in the left and right end portions of the base 9 near the front end thereof. The pin placement regions 14 have respective raised members 14a having partly conical outer profiles and respective rests 14b contiguous to the upper edges of the raised members 14a and shaped as flat plates which are oriented vertically. The raised members 14a are in the form of front halves of conical shapes, and the rests 14b have respective rear halves projecting rearwardly from the respective raised members 14a.

The pin placement regions 14 have spaces defined respectively below the rests 14b and serving as insertion recesses 14c.

Positioning pins 15 are mounted respectively on the rests 14b of the pin placement regions 14. The positioning pins 15 have maximum outside diameters smaller than the outside diameters of the rests 14b.

Upwardly projecting bearing protrusions 16 are disposed on the flat panel 13 near the rear end thereof at laterally spaced positions.

The left side wall 10 of the chassis 7 has a pair of front and rear slide support grooves 17 defined therein at spaced-apart positions and extending in the longitudinal, i.e., anteroposterior, direction of the left side wall 10. The left side wall 10 also has a pair of assembling recesses 18 defined therein contiguously to the rear ends of the slide support grooves 17. The assembling recesses 18 are open upwardly.

The left side wall 10 has an operating bar support groove 19 defined therein between the slide support grooves 17 and extending in the longitudinal direction of the left side wall 10. The left side wall 10 also has an insertion recess 20 defined therein contiguously to the rear end of the operating bar support groove 19. The insertion recess 20 is open upwardly.

The left side wall 10 has a support groove 21 defined therein rearwardly of the rear slide support groove 17. The support groove 21 is open upwardly and has an upper inclined portion 21a and a lower straight portion 21b. The inclined portion 21a is slightly slanted such that it is progressively displaced forwardly in the upward direction, and the straight portion 21b extends vertically.

The left side wall 10 has a portion disposed above the operating bar support groove 19 and projecting rearwardly. A threaded hole 10a is defined in the rear end of the rearwardly projecting portion of the left side wall 10.

The right side wall 11 of the chassis 7 has a pair of front and rear slide support grooves 17 defined therein at spaced-apart positions and extending in the longitudinal direction of the right side wall 11. The right side wall 11 also has a pair of assembling recesses 18 defined therein contiguously to the rear ends of the slide support grooves 17. The assembling recesses 18 are open upwardly.

The right side wall 11 has a pin placement recess 22 defined therein between the slide support grooves 17. The pin placement recess 22 is open upwardly.

The right side wall 11 has a support groove 21 defined therein rearwardly of the rear slide support groove 17. The support groove 21 is open upwardly and has an upper inclined portion 21a and a lower straight portion 21b. The inclined portion 21a is slightly slanted such that it is progressively displaced forwardly in the upward direction, and the straight portion 21b extends vertically.

A spring retainer finger 11a is disposed on the front end of the right side wall 11 and projects to the left.

The rear wall 12 has a spring support finger 12a disposed at a position near the left end thereof and projecting upwardly.

As shown in FIG. 8, a disk table 23 is placed in the table placement hole 9a in the base 9. The disk table 23 comprises a table base 23a and a centering land 23b disposed centrally on the table base 23a. The disk table 23 is fixed to the motor shaft of a spindle motor, not shown. The centering land 23b has a magnet, not shown. The disk table 23 is disposed so as to project upwardly from the table placement hole 9a. The disk table 23 is rotated about its own axis when the spindle motor is energized.

An optical pickup 24 is disposed in the pickup placement hole 9b in the base 9. The optical pickup 24 serves as a recording and reproducing unit for recording an information signal on and/or reproducing an information signal from the recording medium 200 in the recording medium cartridge 100.

The optical pickup 24 has a movable base 25 and an objective lens actuator 26 supported on the movable base 25. The movable base 25 has a pair of bearings 25a, 25b disposed on respective opposite ends thereof. The bearing 25a is threaded over a lead screw 27, and the bearing 25b is supported on a guide shaft 28.

The optical pickup 24 is placed in the pickup placement hole 9b with the lead screw 27 being rotatably supported on a lower surface of the base 9 and with the guide shaft 29 being fixed to the lower surface of the base 9. When the lead screw 27 is rotated about its own axis, the optical pickup 24 is moved in the pickup placement hole 9b while being guided by the guide shaft 28.

A drive motor 29 is disposed in the motor placement hole 9c in the base 9. When the drive motor 29 is energized, its drive force is transmitted through gears, not shown, to the lead screw 27, causing the lead screw 27 to rotate to move the optical pickup 24 in a direction depending on the direction in which the motor shaft of the drive motor 29 rotates.

An ejection lever 30 (see FIG. 8) is angularly movably supported on the rear end of the base 9 of the chassis 7.

Figure 11:
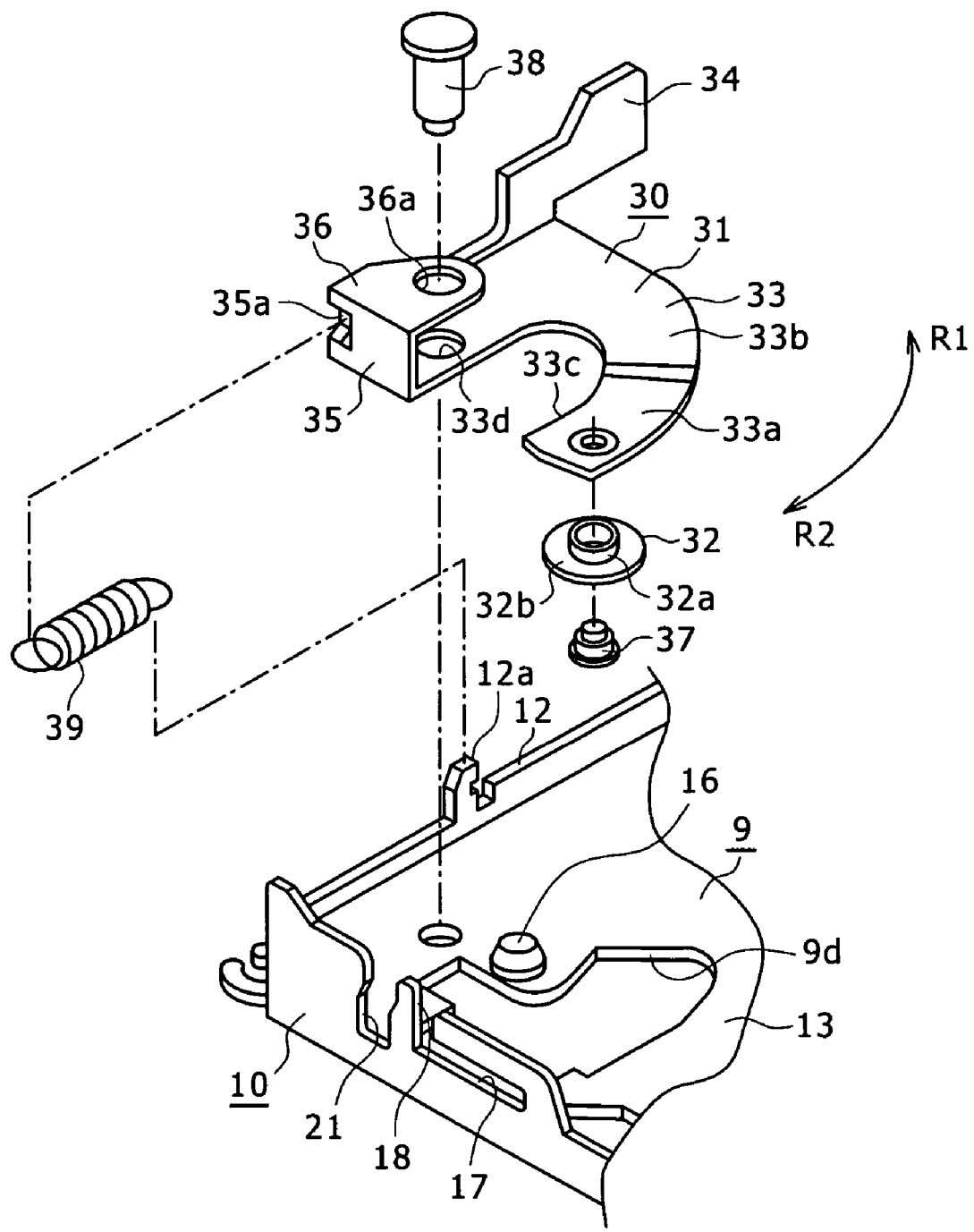
FIG. 11 is an enlarged fragmentary exploded perspective view of a portion of the chassis and an ejection lever.

As shown in FIG. 11, the ejection lever 30 comprises a lever body 31 and a sliding contact engagement member 32 rotatably supported on the lever body 31.

The lever body 31 is constructed of a metal plate bent to a predetermined shape, and comprises a substantially U-shaped slide surface member 33, an acting surface member 34 projecting upwardly from a rear end of the slide surface member 33, a support protrusion 35 projecting upwardly from a left edge of the slide: surface member 33, and a confronting surface member 36 projecting rightwards from an upper edge of the support protrusion 35.

The slide surface member 33 has a front lower surface segment 33a and a rear higher surface segment 33b, the front lower surface segment 33a being lower than the rear higher surface segment 33b with a step interposed therebetween. The front lower surface segment 33a has a rear contact edge 33c.

The sliding contact engagement member 32 is rotatably supported on a lower surface of the distal end of the front lower surface segment 33a by a retaining shaft 37. The sliding contact engagement member 32 has an upper small-diameter shank 32a and a lower large-diameter flange 32b positioned underneath the upper small-diameter shank 32a. The slide surface member 33 has a shaft insertion hole 33d defined therein at a position below the confronting surface member 36.

The acting surface member 34 has a portion projecting rightwards from the slide surface member 33.

The support protrusion 35 has a spring retainer 35a on its rear end.

The confronting surface member 36 is positioned in confronting relation to the slide surface member 33, and has a shaft insertion hole 36a defined therein at a position directly above the shaft insertion hole 33d.

The ejection lever 30 is angularly movably supported on the base 9 by a support shaft 38 extending through the shaft insertion holes 33d, 36a. The support shaft 38 is disposed immediately behind the placement hole 9d in the base 9. With the ejection lever 30 being supported on the base 9, the lower surface member 33a of the slide surface member 33 and the sliding contact engagement member 32 are disposed in the placement hole 9d.

Since the sliding contact engagement member 32 that projects downwardly from the slide surface member 33 is disposed in the placement hole 9d with the ejection lever 30 being supported on the base 9, the base 9 and the sliding contact engagement member 32 are held out of interference with each other, and the recording medium drive unit 6 is made low in profile.

With the ejection lever 30 being angularly movably supported on the base 9, the left bearing protrusion 16 on the base 9 is positioned at all times between the lower surface member 33a and the higher surface-member 33b of the slide surface member 33. Therefore, the recording medium cartridge 100 placed on the bearing protrusion 16 is prevented from interfering with the injection lever 30.

An urging spring 39 is supported between the spring retainer 35a of the injection lever 30 and the spring support finger 12a of the rear wall 12 of the chassis 7. The urging spring 39 normally urges the ejection lever 30 to turn clockwise about the retaining shaft 37 in the direction indicated by the arrow R2 in FIG. 11.

Because the ejection lever 30 has the confronting surface member 36 bent from the support protrusion 35, the support protrusion 35 that is subject to the biasing force from the urging spring 39 is rigid enough to prevent the ejection lever 30 from being deformed and from being tilted with respect to the chassis 7 under the biasing force of the urging spring 39.

As shown in FIG. 8, an ejection slider 40 is slidably supported on the chassis 7 for sliding movement in the anteroposterior direction.

Figure 12:
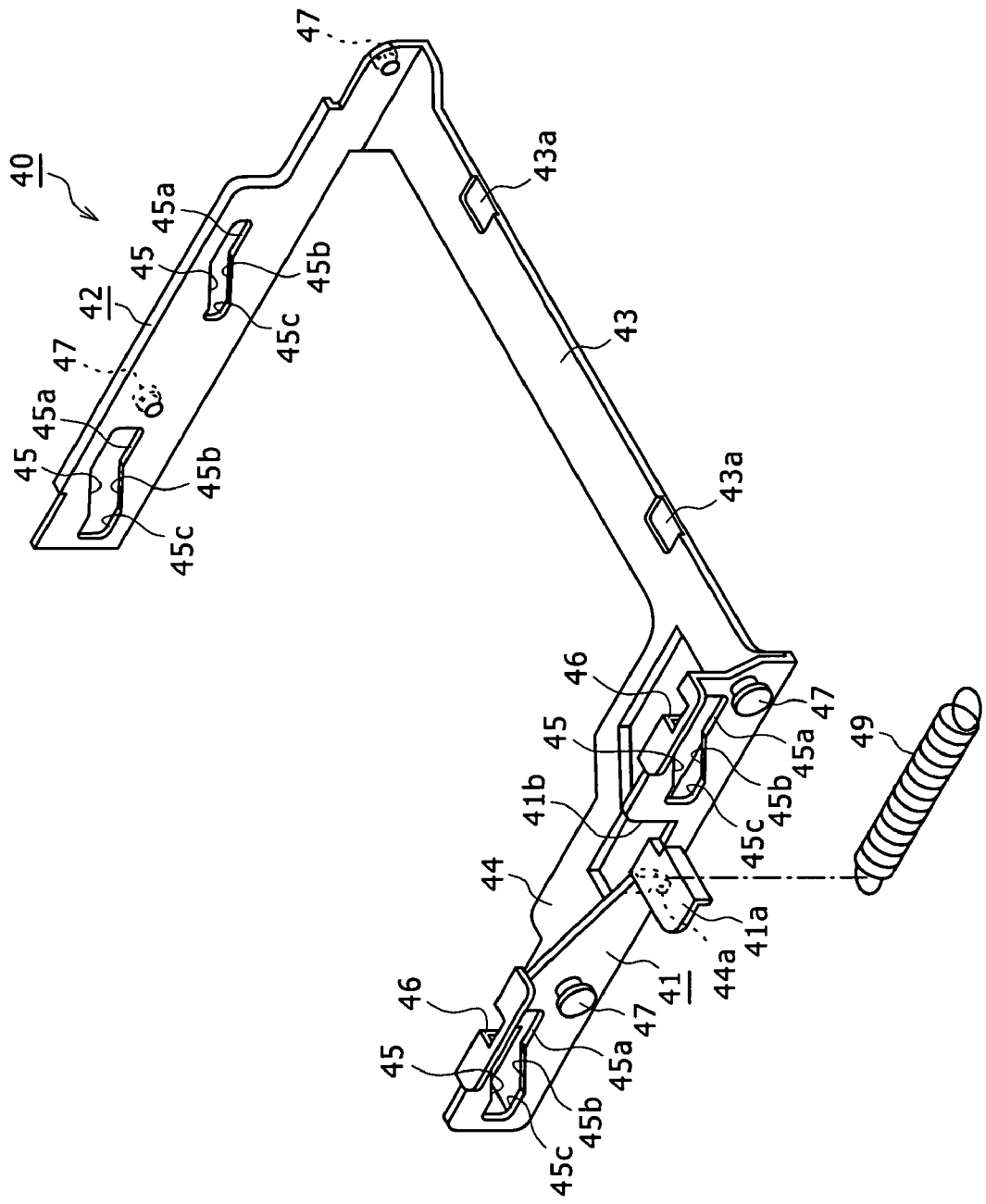
FIG. 12 is an enlarged perspective view of an ejection slider.
Figure 13:
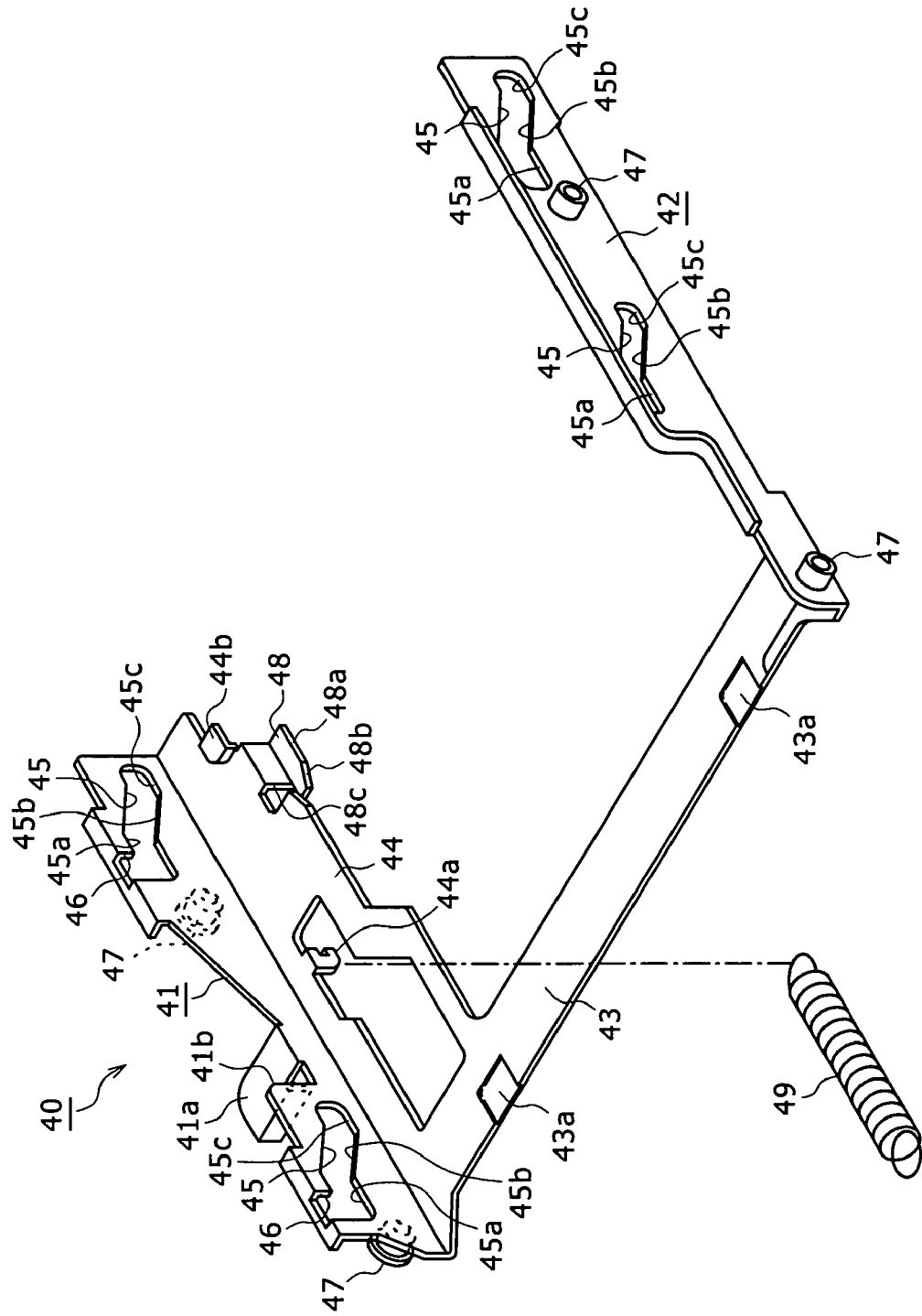
FIG. 13 is an enlarged perspective view of the ejection slider as viewed in a direction different from FIG. 12.

As shown in FIGS. 12 and 13, the ejection slider 40 is constructed of a metal plate bent to a predetermined shape, and comprises a pair of left and right side plates 41, 42 spaced laterally from each other, a bridge 43 interconnecting the front ends of the side plates 41, 42, and a protrusive surface member 44 projecting rearwardly from the left end of the bridge 43.

The left side plate 41 has a pair of cam grooves 45 defined therein which are spaced from each other in the longitudinal or anteroposterior direction of the left side plate 41. Each of the cam grooves 45 comprises an upper horizontal segment 45a extending in the anteroposterior direction, a slanted segment 45b extending contiguously from the rear end of the upper horizontal segment 45a and progressively slanted downwardly in the rearward direction, and a lower horizontal segment 45c extending contiguously from the rear end of the slanted segment 45b and extending in the anteroposterior direction.

The side plate 41 also has a pair of assembling grooves 46 extending contiguously from the respective front ends of the upper horizontal segments 45a of the cam grooves 45. The assembling grooves 46 are open upwardly.

The side plate 41 has an operating bar 41a projecting leftwards therefrom between the cam grooves 45.

The side plate 41 also has an upwardly open recess defined therein between the cam grooves 45. The recess is partly defined by a vertical stop edge 41b positioned between the front cam groove 45 and the operating bar 41a.

Two support shafts 47 which project leftwards are mounted on the side plate 41 and spaced from each other in the posteroanterior direction.

The right side plate 42 also has a pair of cam grooves 45 defined therein which are spaced from each other in the longitudinal or anteroposterior direction of the right side plate 42. Each of the cam grooves 45 comprises an upper horizontal segment 45a extending in the anteroposterior direction, a slanted segment 45b extending contiguously from the rear end of the upper horizontal segment 45a and progressively slanted downwardly in the rearward direction, and a lower horizontal segment 45c extending contiguously from the rear end of the slanted segment 45b and extending in the anteroposterior direction.

Two support shafts 47 which project leftwards are mounted on the side plate 42 and spaced from each other in the posteroanterior direction.

The bridge 43 has a pair of thin portions 43a on a front, substantially half section thereof near the respective left and right ends thereof. The thin portions 43a are thinner than the remainder of the bridge 43.

The protrusive surface member 44 has a spring retainer finger 44a projecting downwardly from a substantially central portion thereon in the posteroanterior direction, and an assistive presser 44b disposed at a position near the rear end of the protrusive surface member 44.

The protrusive surface member 44 also includes a sliding engagement member 48 projecting downwardly from a portion thereof near the rear end of the protrusive surface member 44. The sliding engagement member 48 includes a flange projecting to the right and having a right holding edge 48a extending in the posteroanterior direction. The sliding engagement member 48 also has an acting edge 48b contiguous to the right holding edge 48a and progressively slanted to the left in the forward direction. The downwardly projecting portion of the sliding engagement member 48 has a front edge serving as a sliding edge 48c.

The ejection slider 40 is slidably supported on the chassis 7 as follows: The support shafts 47 are inserted downwardly into the respective assembling recesses 18 in the side walls 10, 11 of the chassis 7, and the operating bar 41a is inserted downwardly into the insertion recess 20 in the side wall 10. Then, the support shafts 47 are displaced forwardly and inserted forwardly into the respective slide support grooves 17, and the operating bar 41a is inserted forwardly into the operating bar support groove 19.

With the ejection slider 40 slidably supported on the chassis 7, the side plates 41, 42 are slidable against the respective inner surfaces of the slide walls 10, 11, the bridge 43 is slidable against the upper surface of the base 9 between the disk table 23 and the pin placement regions 14, and the protrusive surface member 44 is slidable against a left end portion of the upper surface of the base 9. The operating bar 41a projects leftwards from the side wall 10 of the chassis 7 (see FIG. 9).

With the ejection slider 40 slidably supported on the chassis 7, the protrusive surface member 44 is positioned on the base 9, and the sliding engagement member 48 is capable of contacting the shank 32a of the sliding contact engagement member 32 of the ejection lever 30. When the sliding engagement member 48 is in contact with the shank 32a upon movement of the ejection slider 40 in the posteroanterior direction with respect to the chassis 7, the shank 32a is rotated with respect to the holding edge 48a or the acting edge 48b of the sliding engagement member 48.

With the ejection slider 40 slidably supported on the chassis 7, a helical spring 49 is supported between the spring retainer finger 9e of the chassis 7 and the spring retainer finger 44a of the ejection slider 40 (see FIGS. 8 and 13). The helical spring 49 can be extended and contracted in the anteroposterior direction. The sliding engagement member 48 of the ejection slider 40 and the sliding contact engagement member 32 of the ejection lever 30 engage each other at a position which is located substantially rearwardly of the helical spring 49 in the direction in which it is extended and contracted. The helical spring 49 comprises a tension helical spring for normally biasing the ejection slider 40 to move forwardly with respect to the chassis 7.

With the ejection slider 40 slidably supported on the chassis 7, the sliding engagement member 48 is disposed in the placement hole 9d in the base 9. Therefore, the base 9 and the sliding engagement member 48 are held out of interference with each other, and the recording medium drive unit 6 is made low in profile.

As shown in FIG. 8, an opening and closing cover 50 is angularly movably supported on the front ends of the side walls 10, 11 of the chassis 7. The opening and closing cover 50 is elongate in the lateral direction across the chassis 7, and has pivot shafts 50a (see FIG. 14) on respective upper ends of the left and right ends thereof. The pivot shafts 50a are pivotally supported on the front ends of the side walls 10, 11 of the chassis 7, making it possible for the opening and closing cover 50 to be angularly movable with respect to the chassis 7.

The opening and closing cover 50 has a spring retainer hole 50b defined in the right end thereof. A spring 51 is supported between the spring retainer hole 50b and the spring retainer finger 11a on the right side wall 11. The opening and closing cover 50 is normally biased by the spring 51 to turn in a direction to cause the lower end thereof to move substantially forwardly.

As shown in FIG. 8, a slot member 52 is mounted on the front ends of the side walls 10, 11 of the chassis 7. The slot member 52 is elongate in the lateral direction across the chassis 7, and is fastened to the side walls 10, 11 by screws, for example, in covering relation to the opening and closing cover 50 in its entirety.

Figure 14:
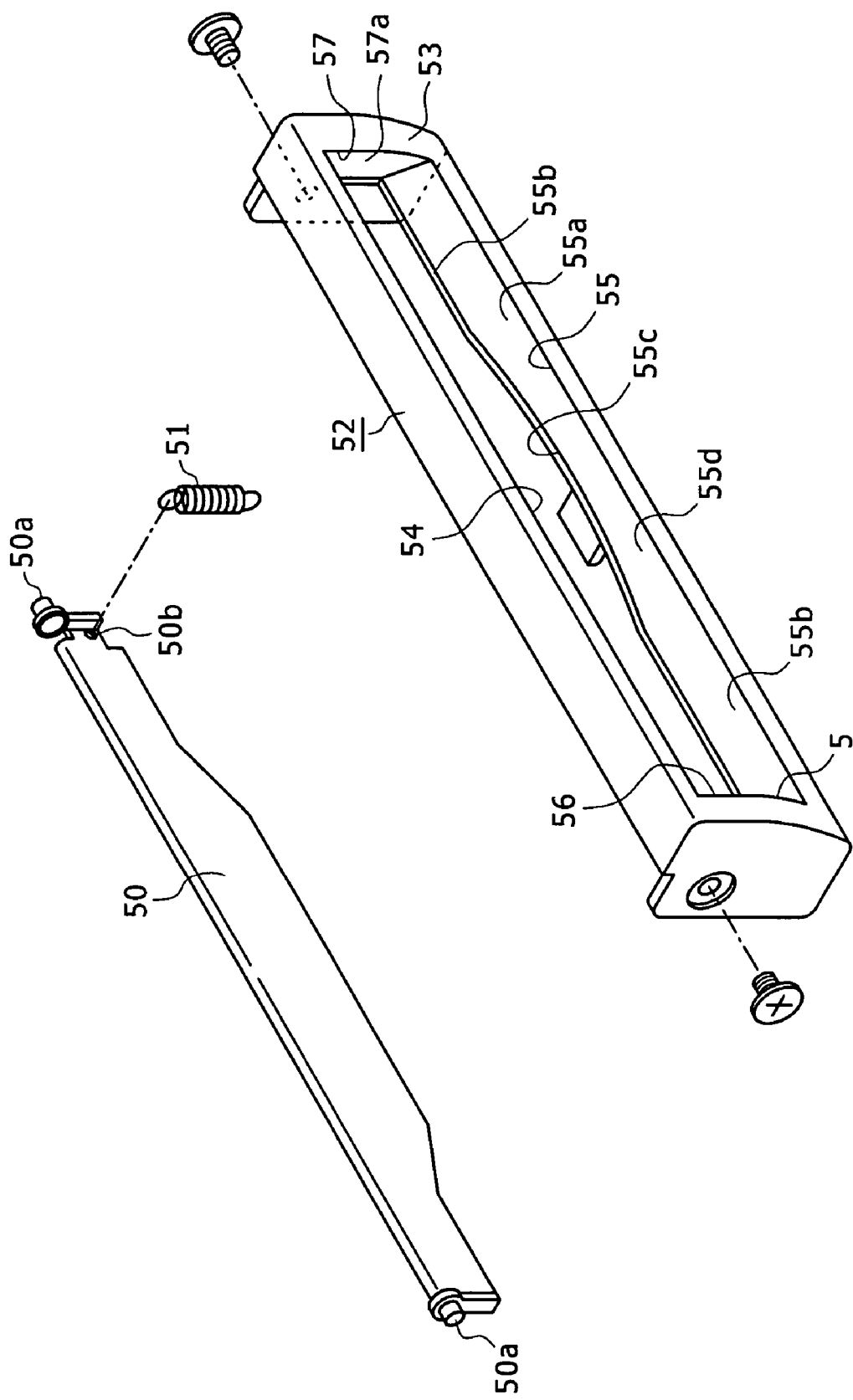
FIG. 14 is an enlarged perspective view of an openable and closable cover and an opening member.
Figure 15:
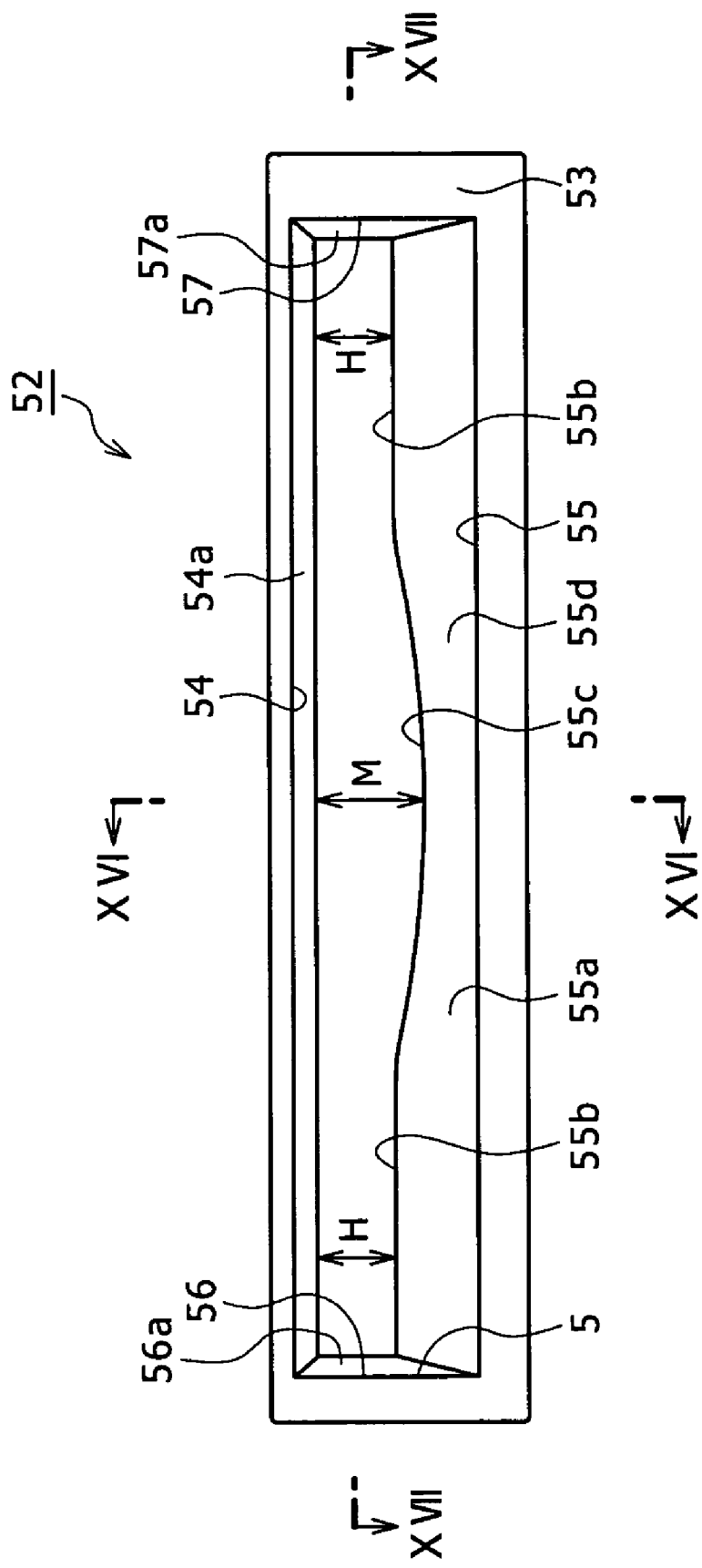
FIG. 15 is an enlarged front elevational view of the opening member.
Figure 16:
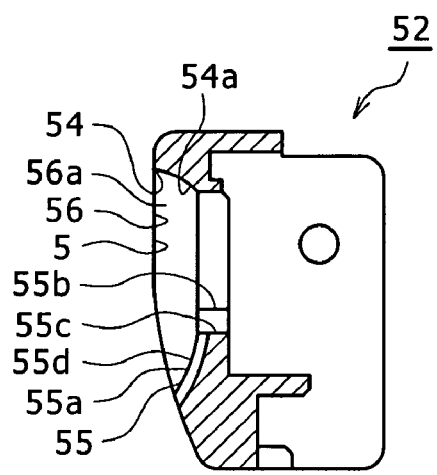
FIG. 16 is a cross-sectional view taken along line XVI-XVI of FIG. 15.

The slot member 52 has a horizontally elongate insertion slot 5 defined in a front panel 53 thereof for the insertion of the recording medium cartridge 100 therethrough (see FIGS. 14 and 15). The insertion slot 5 is defined by a first slot edge 54 and a second slot edge 55 which are disposed respectively in upper and lower positions and a third slot edge 56 and a fourth slot edge 57 which are disposed respectively in left and right positions.

The first slot edge 54, the second slot edge 55, the third slot edge 56, and the fourth slot edge 57 have respective guide surfaces 54a, 55a, 56a, 57a that are gradually slanted such that the insertion slot 55 is progressively smaller in size in the rearward direction (see FIGS. 14 through 17).

Since the guide surfaces 54a, 55a, 56a, 57a are present in the insertion slot 5, when the recording medium cartridge 100 is put into the insertion slot 5, the recording medium cartridge 100 is guided by the guide surfaces 54a, 55a, 56a, 57a for smooth insertion into the insertion slot 5.

As shown in FIG. 15, the second slot edge 55 comprises two left and right straight edges 55b extending laterally in the insertion slot 5 and a central curved edge 55c positioned between the straight edges 55b. The curved edge 55c is of a symmetrical shape with respect to the center of the insertion slot 5 in the lateral direction, and is of a curved shape gradually displaced upwardly from the center toward the straight edges 55b. Therefore, as shown in FIG. 15, the insertion slot 5 has a maximum vertical width M at the center thereof in the lateral direction and minimum vertical widths H at the straight edges 55b, and is progressively smaller in width from the center toward the straight edges 55b.

Inasmuch as the slot member 52 is of a shape having the maximum vertical width M at the center in the lateral direction of the insertion slot 5, when the user places the recording medium cartridge 100 into the insertion slot 5, the user can easily insert a finger deeply into the insertion slot 5 for smooth insertion of the recording medium cartridge 100 into the insertion slot 5.

Furthermore, because the second slot edge 55 of the insertion slot 5 includes the curved edge 55c positioned between the straight edges 55b, when the recording medium cartridge 100 put into the insertion slot 5, the recording medium cartridge 100 is not caught by the second slot edge 55, but can smoothly be inserted into the insertion slot 5.

In the illustrated embodiment, only the second slot edge 55 has the curved edge 55c and the insertion slot 5 has the maximum vertical width M at center of the curved edge 55c. However, only the first slot edge 54, rather than the second slot edge 55, may have a curved edge and the insertion slot 5 may have a maximum vertical width at the center of the curved edge. Alternatively, both the first slot edge 54 and the second slot edge 55 may have respective curved edges, and the insertion slot 5 may have a maximum vertical width at the center of the curved edges.

Figure 17:
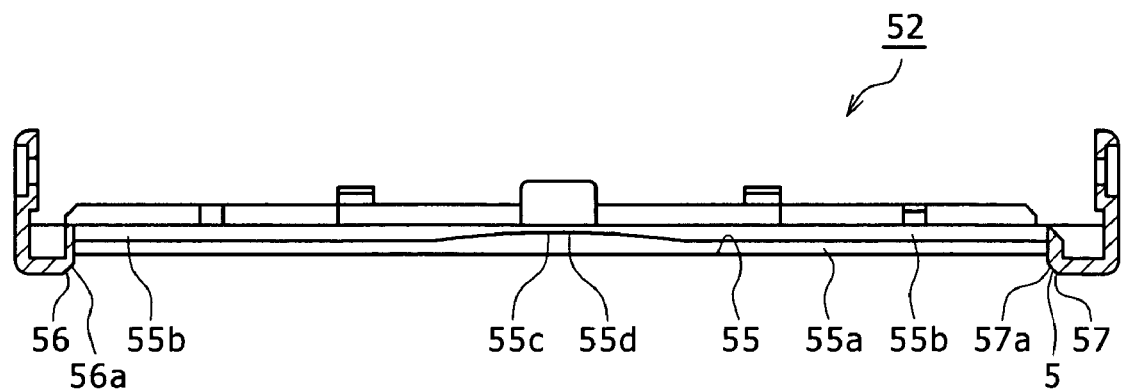
FIG. 17 is a cross-sectional view taken along line XVII-XVII of FIG. 15.

As shown in FIG. 17, the second slot edge 55 has a central portion in the lateral direction which is shaped as a gradually curved recess 55d that is concave rearwardly.

Therefore, when the user places the recording medium cartridge 100 into the insertion slot 5, the user can easily insert a finger deeply into the insertion slot 5 for smooth insertion of the recording medium cartridge 100 into the insertion slot 5.

The recess may be defined in the first slot edge 54, rather than the second slot edge 55, or may be defined in both the first slot edge 54 and the second slot edge 55.

Figure 18:
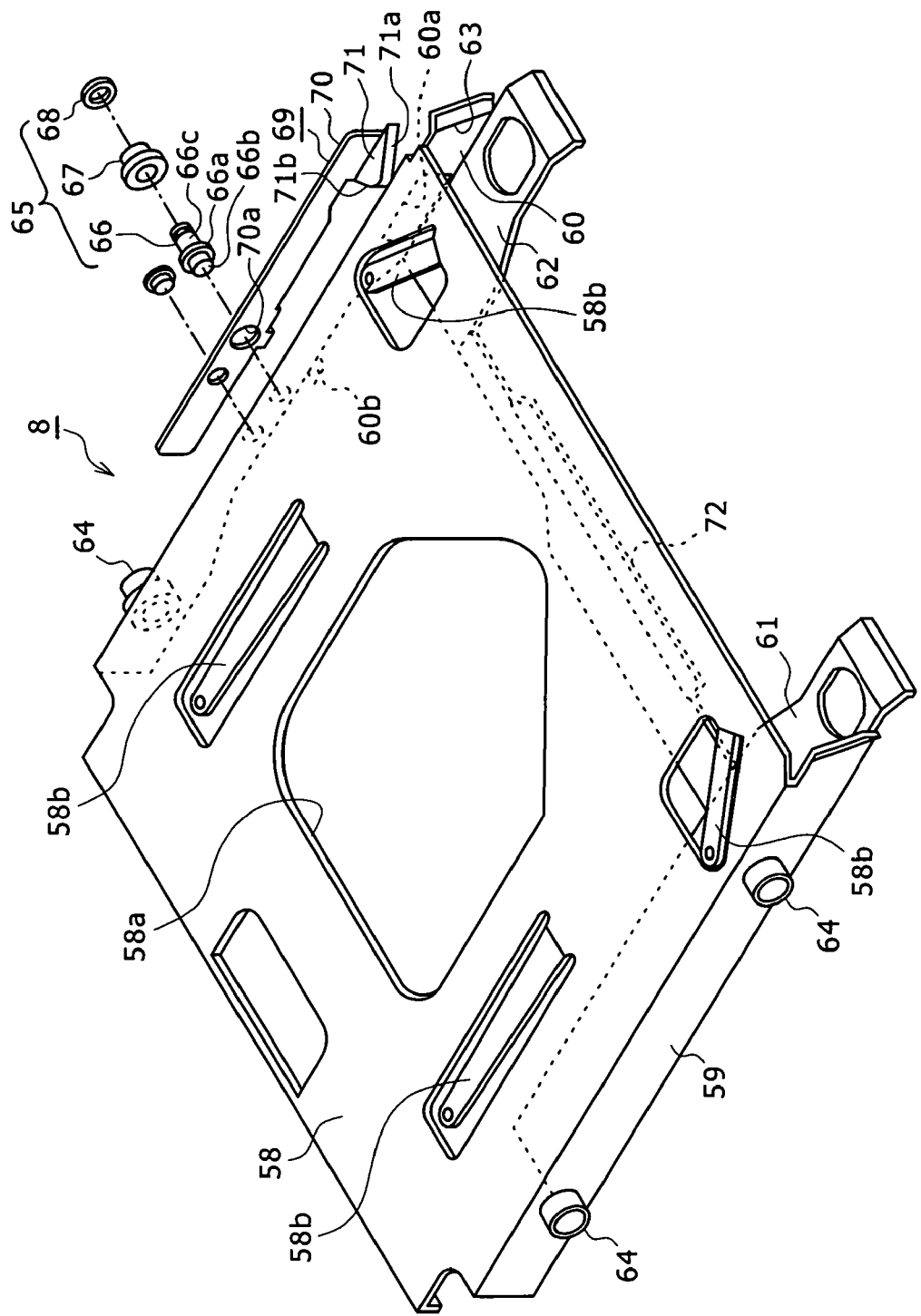
FIG. 18 is an enlarged exploded perspective view of a holder and a shutter opening and closing spring.

The holder 8 is of a unitary structure made of a metal plate. As shown in FIGS. 8 and 18, the holder 8 comprises a substantially square joint surface member 58, a pair of side walls 59, 60 extending downwardly from respective laterally opposite side edges of the joint surface member 58, and a pair of protrusive ledge members 61, 62 projecting toward each other from respective lower edges of the side walls 59, 60. The left protrusive ledge member 61 extends from the front end of the side wall 59 to a position near the rear end of the side wall 59. The right protrusive ledge member 62 is present only in a position near the front end of the side wall 60. The protrusive ledge members 61, 62 are positioned in confronting relation to the joint surface member 58.

The joint surface member 58, the side walls 59, 60, and the protrusive ledge members 61, 62 jointly define a space in the front end of the holder 8. The space serves as an insertion slot for the insertion of the recording medium cartridge 100 therethrough.

The joint surface member 58 of the holder 8 has an opening 58a defined centrally therein. The opening 58a is provided for the purpose of making the holder 8 lighter in weight. The joint surface member 58 also has a plurality of presser springs 58b in the form of arms cut outland raised from the joint surface member 58. When the recording medium cartridge 100 is held in the holder 8, the presser springs 58b hold the case 101 of the recording medium cartridge 100 against the rests 14b and the bearing protrusions 16 on the chassis 9.

The left side wall 59 of the holder 8 has two supported pins 64 projecting leftwards therefrom and spaced from each other in the longitudinal or anteroposterior direction. The supported pins 64 are rotatable with respect to the left side wall 59.

The right side wall 60 of the holder 8 has a tooth insertion hole 60a defined therein at a position near the front end thereof. The right side wall 60 also has a shutter opening member 60b bent inwardly therefrom at a position behind the tooth insertion hole 60a, and an attitude holding member 60c bent inwardly therefrom at a position behind the shutter opening member 60b. Each of the shutter opening member 60b and the attitude holding member 60c is in the form of a tongue which is elongate in the longitudinal or anteroposterior direction.

The right side wall 60 has a supported pin 64 projecting rightwards therefrom at a position near the rear end thereof. The supported pin 64 is rotatable with respect to the right side wall 60.

Figure 19:
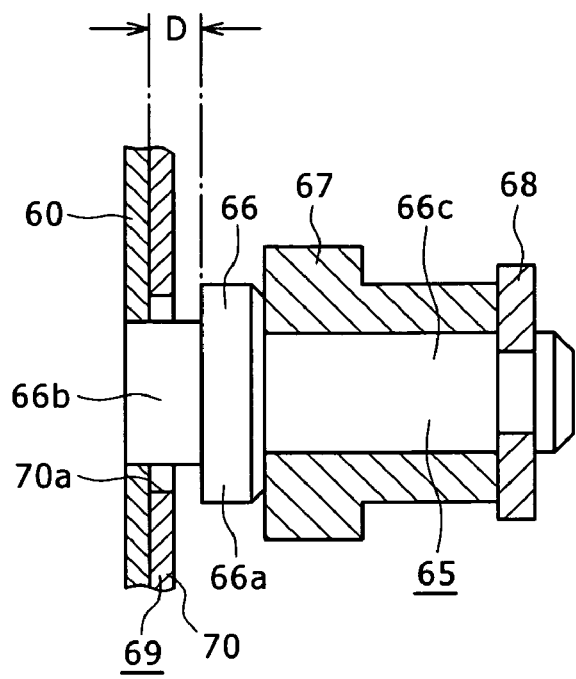
FIG. 19 is an enlarged cross-sectional view of a supported shaft mounted on the holder.

A supported pin 65 projects rightwards from a portion of the right side wall 60 which is substantially central in the longitudinal or anteroposterior direction. As shown in FIGS. 18 and 19, the supported pin 65 comprises a support shaft 66, a rotary sleeve 67, and a washer 68. The rotary sleeve 67 is rotatably supported on the support shaft 66 and is retained by the washer 68 on the support shaft 66 against dislodgment from the support shaft 66.

The support shaft 66 comprises a large-diameter restrictive member 66a, a small-diameter insert 66b mounted on one side of the large-diameter restrictive member 66a, and a support 66c mounted on the other side of the large-diameter restrictive member 66a. The insert 66b has a left end mounted on the side wall 60. With the support shaft 66 mounted on the side wall 60, the side wall 60 and the restrictive member 66a are spaced from each other by a gap D (see FIG. 19).

As shown in FIGS. 8 and 18, a shutter opening and closing spring 69 is mounted on an outer surface of the side wall 60.

The shutter opening and closing spring 69 comprises a spring bar 70 that is elongate in the anteroposterior direction and an unlocking tooth 71 projecting leftwards from a lower edge of the front end of the spring bar 70.

The spring bar 70 has an insertion hole 70a defined in a portion thereof which is substantially central in the anteroposterior direction. The insertion hole 70a has a diameter greater than the outside diameter of the insert 66b of the support shaft 66 (see FIG. 19).

As shown in FIG. 18, the unlocking tooth 71 is of a triangular shape which is convex to the left. The unlocking tooth 71 has a first slanted edge 71a that is progressively displaced to the left in the rearward direction and a second slanted edge 71b that is progressively displaced to the left in the forward direction. The first slanted edge 71a and the second slanted edge 71b are contiguous to each other in the anteroposterior direction.

The shutter opening and closing spring 69 is mounted on the outer surface of the side wall 60 with the insert 66b of the support shaft 66 being inserted in the insertion hole 70a. Specifically, the shutter opening and closing spring 69 has a portion rearwards of the insertion hole 70a which is fastened to the side wall 60 by staking, for example. Therefore, the shutter opening and closing spring 69 has an elastically deformable portion forwards of the portion thereof that is fastened to the side wall 60.

With the shutter opening and closing spring 69 mounted on the side wall 60, the unlocking tooth 71 projects inwards from the tooth insertion hole 60a in the side wall 60.

The shutter opening and closing spring 69 is elastically deformed when the recording medium cartridge 100 is inserted into and ejected from the holder 8. Since the spring bar 70 has the insertion hole 70a and the supported pin 65 is inserted in the insertion hole 70a, the spring bar 70 and the supported pin 65 are held out of interference with each other. Therefore, the spring bar 70 can be elongate in the anteroposterior direction. As a result, the spring bar 70 can be elastically deformed to a greater extent, allowing the shutter opening and closing spring 69 to operate more reliably.

Figure 20:
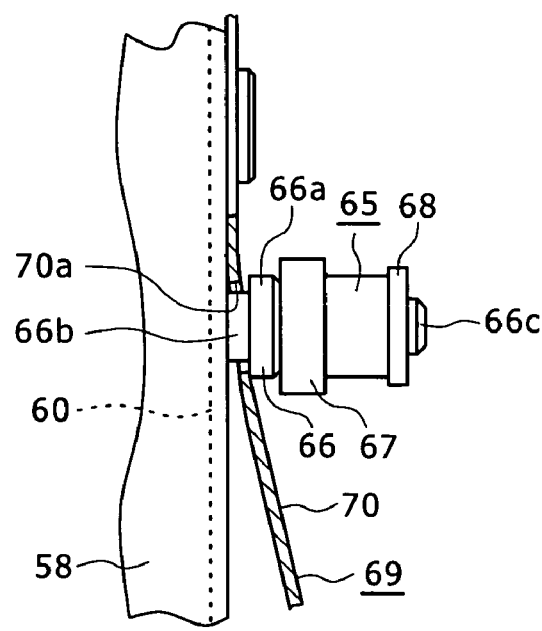
FIG. 20 is an enlarged plan view, partly in cross section, of the shutter opening and closing spring as it is deformed.

The shutter opening and closing spring 69 is elastically deformable until the spring bar 70 contacts the restrictive member 66a of the supported pin 65, as shown in FIG. 20. Consequently, the shutter opening and closing spring 69 is prevented from being excessively deformed.

As shown in FIGS. 8 and 18, a laterally elongate dislodgment prevention member 72 is attached to and extends between the protrusive ledge members 61, 62 of the holder 8. The dislodgment prevention member 72 serves to prevent the recording medium cartridge 100 from being dislodged downwardly from the holder 8 when the recording medium cartridge 100 is inserted into the holder 8.

A screw can be threaded into the threaded hole 10a defined in the left side wall 10. The screw functions as a stopper 73 for limiting rearward movement of the ejection slider 40 with respect to the chassis 7. The stopper 73 is not limited to a screw, but may comprise any member insofar as it can removably be attached to the side wall 10.

Figure 21:
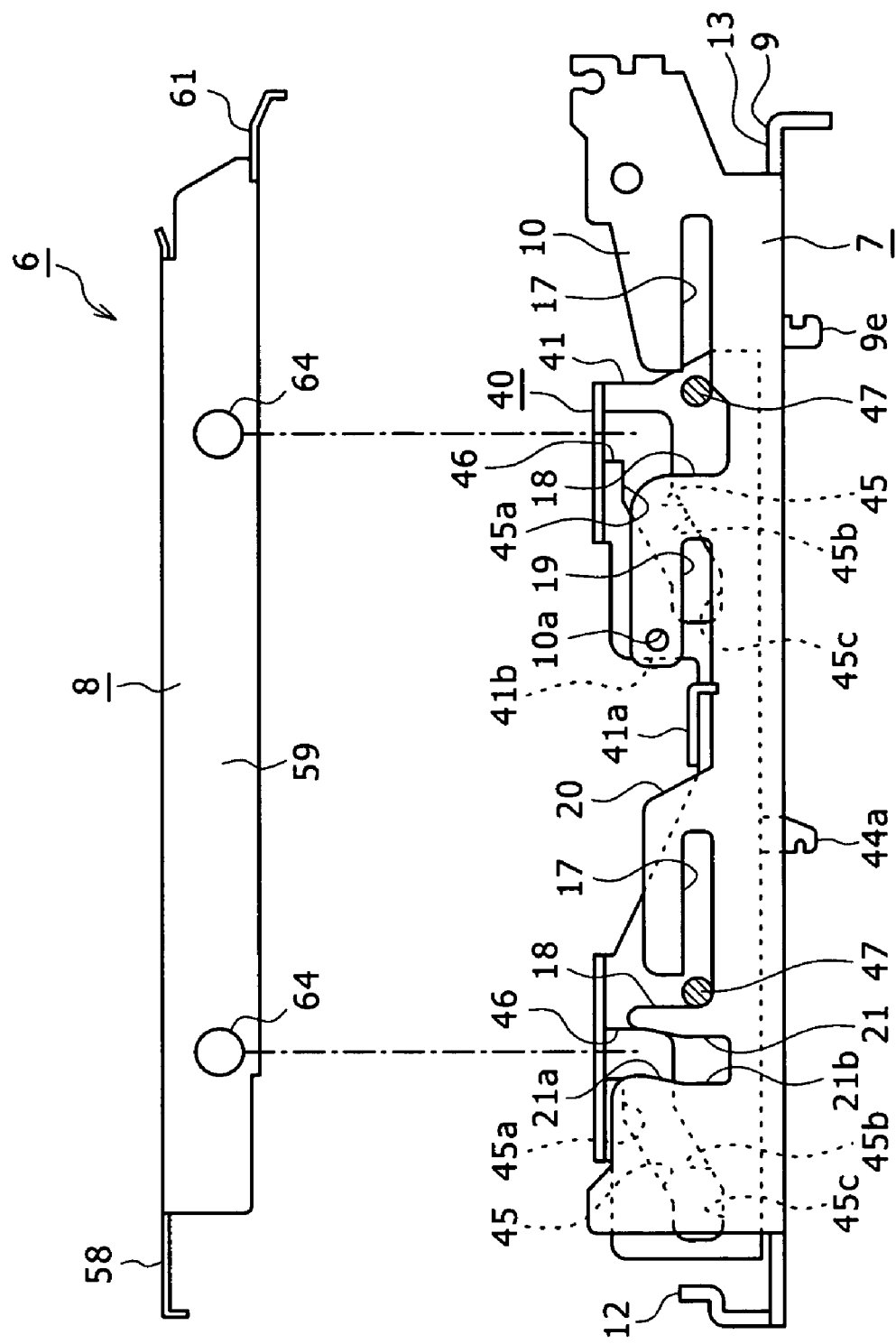
FIG. 21 is an enlarged left-hand side elevational view showing the manner in which the ejection slider is moved to a rear stroke end with a stopper removed.
Figure 22:
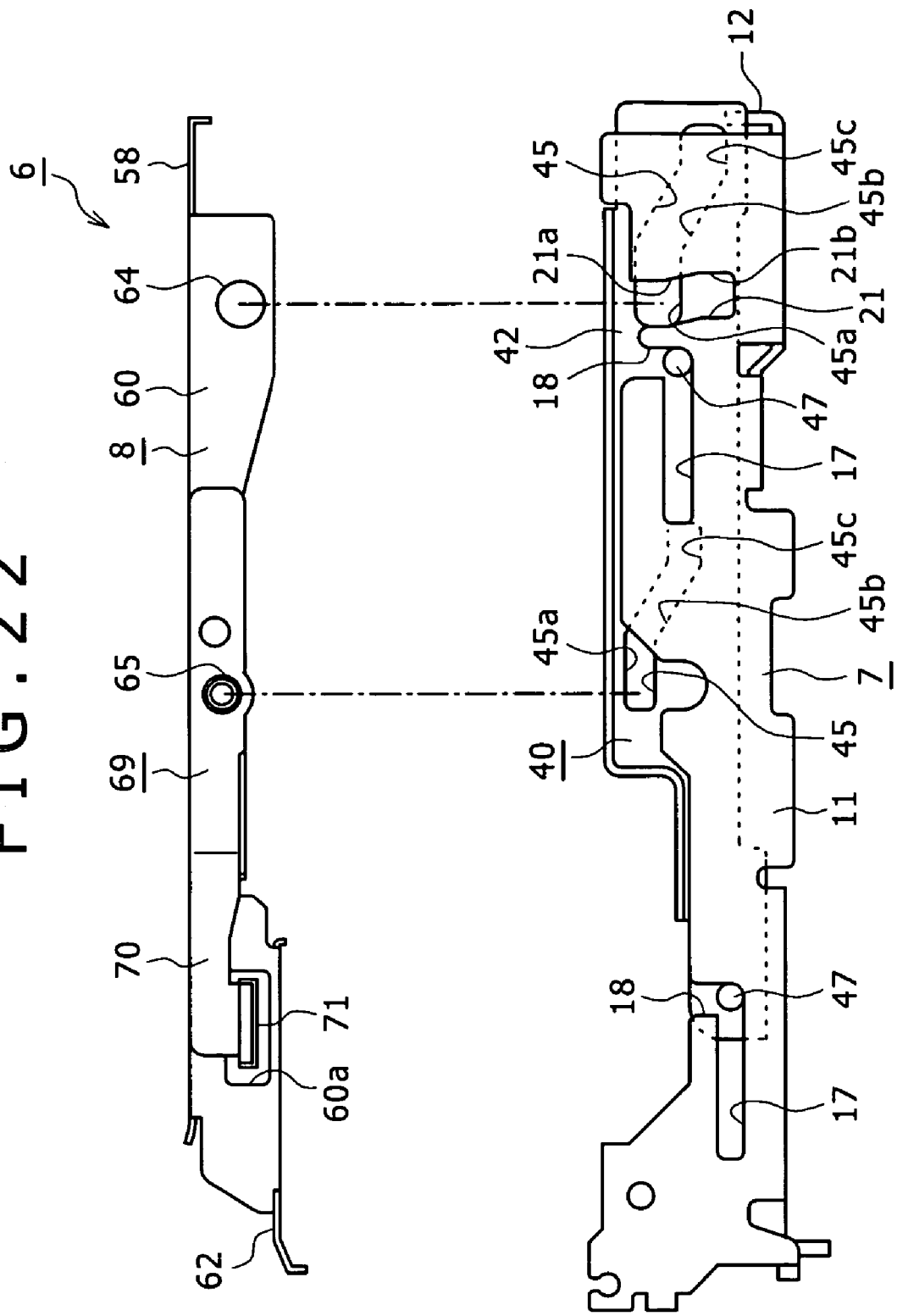
FIG. 22 is an enlarged right-hand side elevational view showing the manner in which the ejection slider is moved to the rear stroke end with the stopper removed.

With the ejection slider 40 movably supported on the chassis 7, the holder 8 is assembled and supported on the chassis 7 and the ejection slider 40 as follows:

When the holder 8 is to be assembled, the stopper 73 is removed from the side wall 10 of the chassis 7, and the ejection slider 40 is at the rear stroke end without the stopper 73, i.e., in an assembling position for assembling the holder 8 (see FIGS. 21 and 22).

With the ejection slider 40 at the rear stroke end, the upper horizontal segments 45a of the cam grooves 45 in the side plate 41 are positioned in alignment with the support groove 21 and the assembling recess 18, respectively, in the side wall 10 of the chassis 7, and the upper horizontal segments 45*a* of the cam grooves 45 in the side plate 42 are positioned in alignment with the support groove 21 and the pin placement recess 22, respectively, in the side wall 11 of the chassis 7.

Then, the holder 8 is tilted with its right-hand side being lowered with respect to the chassis 7. The supported pin 64 on the right side wall 60 of the holder 8 is inserted, from inside, through the upper horizontal segment 45*a* in the side plate 42 of the ejection slider 40 into the support groove 21 in the side wall 11 of the chassis 7, and the supported pin 65 on the right side wall 60 is inserted, from inside, into the upper horizontal segment 45*a* in the side plate 42 of the ejection slider 40.

Then, the side wall 10 is lowered so that the holder 8 titled with its right-hand side being lowered will lie horizontally with respect to the chassis 7. The front supported pin 64 on the left side wall 59 of the holder 8 is inserted, from above, through the assembling groove 46 in the ejection slider 40 into the upper horizontal segment 45*a*, and the rear supported pin 64 on the left side wall 59 is inserted, from above, through the assembling groove 46 in the ejection slider 40 into the upper horizontal segment 45*a* and the support groove 21 in the chassis 7.

The holder 8 is thus movably supported on the chassis 7 and the ejection slider 40 by the above assembling process.

In the recording medium drive unit 6, as described above, the ejection slider 40 is supported on the chassis 7, rather than the holder 8. Therefore, before the holder 8 is assembled onto the ejection slider 40 and the chassis 7, the ejection slider 40 and the ejection lever 30 are supported on the chassis 7 and positioned with respect to each other for making various adjustments such as a skew adjustment for the optical pickup 24. As the holder 8 does not obstruct these adjustments, the adjustments can easily and quickly be made.

Since the holder 8 does not need to have a large hole for the insertion of a jig for the adjustments, the mechanical strength of the holder 8 is not unduly reduced, and the shape of the holder 8 is not unduly complex and does not increase the cost of the recording medium drive unit 6.

Figure 23:
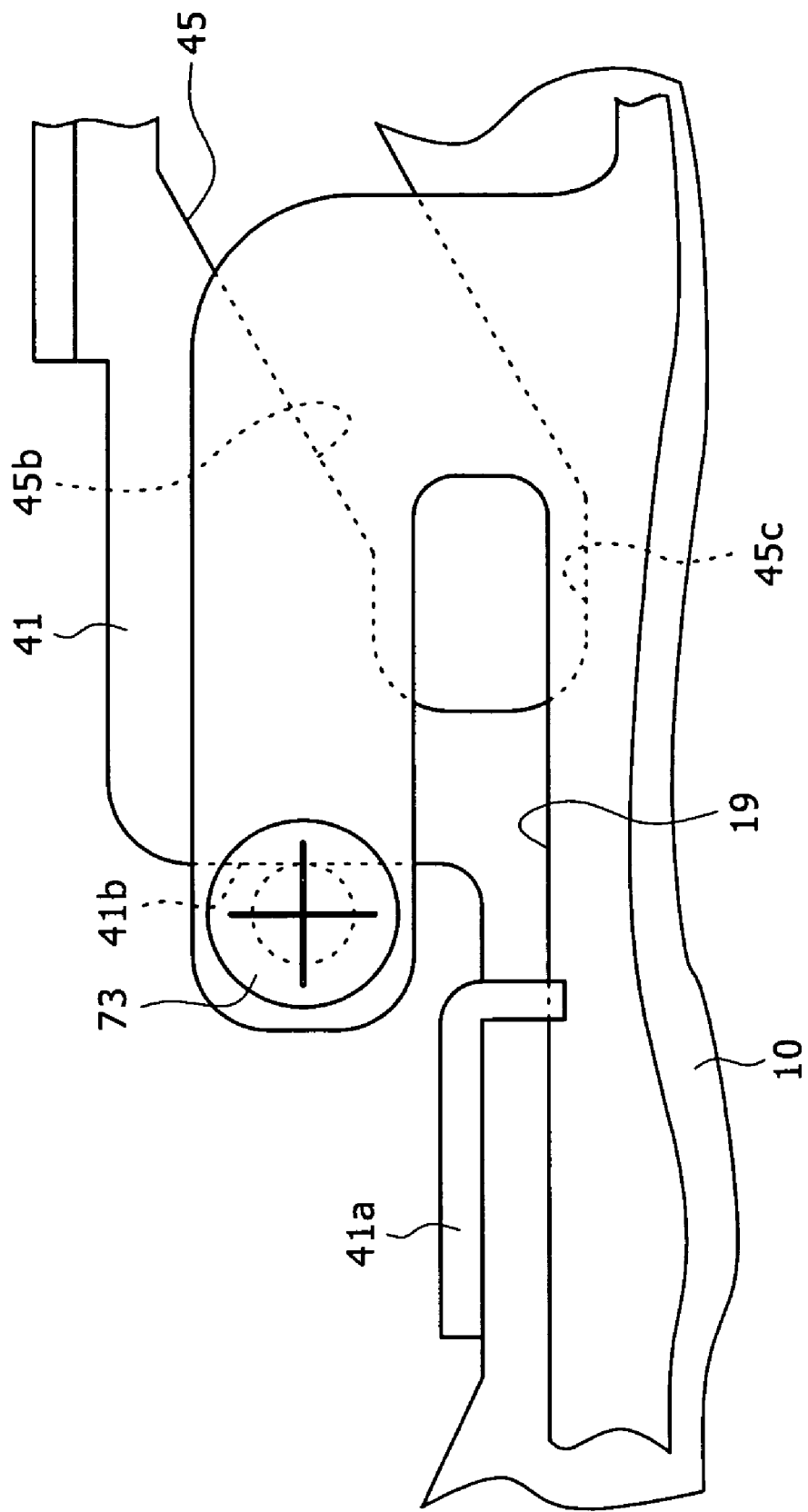
FIG. 23 is an enlarged side elevational view showing the manner in which the ejection slider is limited against rearward movement by the stopper.

With the holder 8 assembled on the ejection slider 40 and the chassis 7, as described above, the ejection slider 40 is moved forwardly with respect to the chassis 7, and the stopper 73 is fastened to the side wall 10 of the chassis 7. When the vertical stop edge 41*b* is brought into contact with the stopper 73 thus fastened to the side wall 10, the ejection slider 40 is prevented from moving further backwards (see FIG. 23). Accordingly, the ejection slider 40 is limited against unnecessary movement with respect to the chassis 7 and is prevented from being dislodged from the chassis 7.

When the stopper 73 is detached from the chassis 7, the holder 8 can freely be assembled onto and disassembled from the chassis 7 and the ejection slider 40, and the ejection slider 40 can freely be assembled onto and disassembled from the chassis 7. Therefore, they can easily be assembled and serviced for maintenance.

Figure 24:
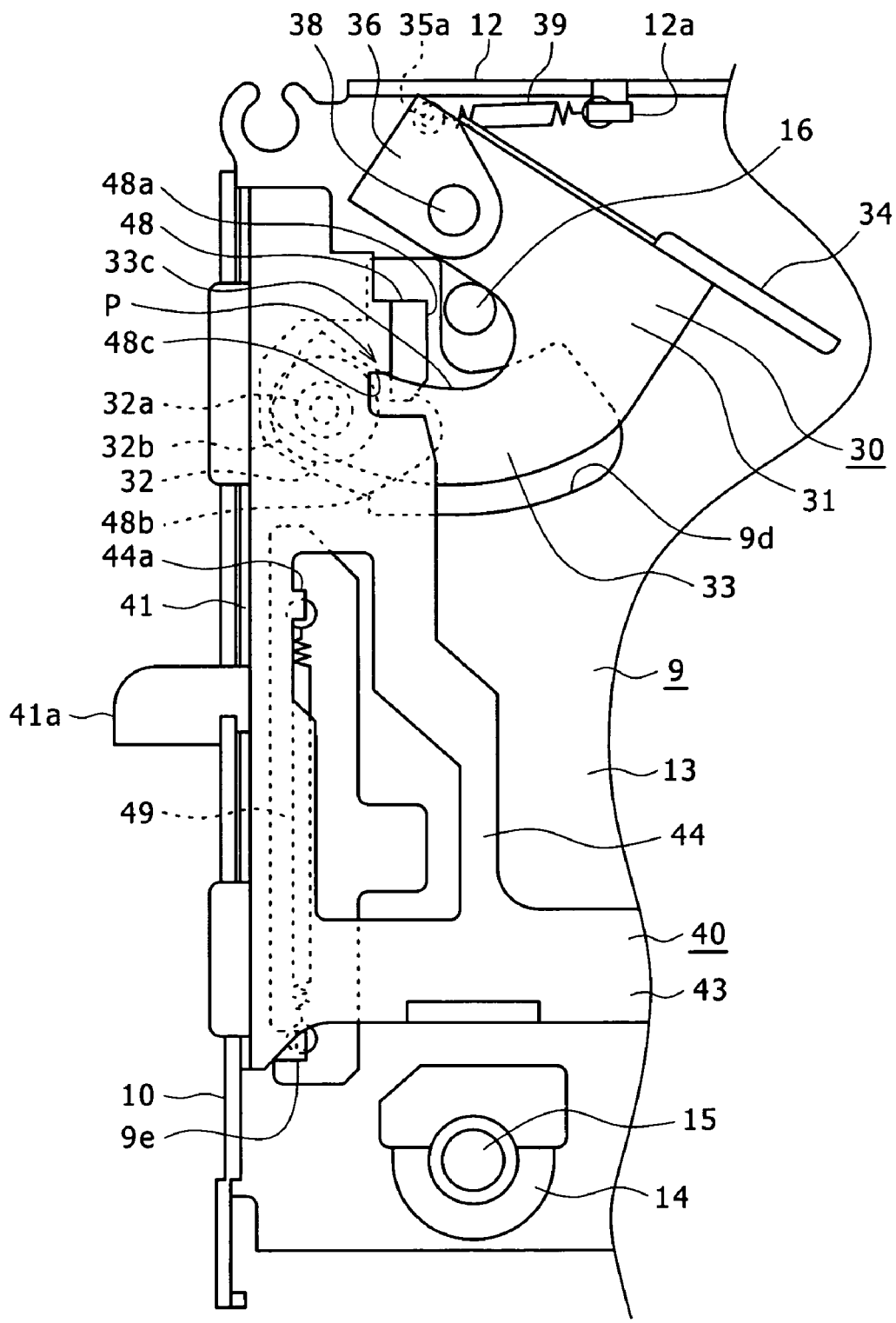
FIG. 24 is an enlarged plan view of a portion of the recording medium drive unit with the holder omitted from illustration.

In the recording medium drive unit 6, as shown in FIG. 24, the sliding engagement member 48 of the ejection slider 40 and the sliding contact engagement member 32 of the ejection lever 30 engage each other at the position (see P in FIG. 24) which is located substantially rearwardly of the helical spring 49, which is supported between:the spring retainer finger 9*e* of the chassis 7 and the spring retainer finger 44*a* of the ejection slider 40, in the direction in which it is extended and contracted. Therefore, the injection slider 40 is not subject to biasing forces from the helical spring 49 in unwanted directions, i.e., in directions other than the anteroposterior direction, so that the sliding engagement member 48 and the sliding contact engagement member 32 are kept in appropriate contact with each other to allow the ejection lever 30 and the ejection slider 40 to operate reliably.

A process of loading the recording medium cartridge 100 and a process of ejecting the recording medium cartridge 100 will be described below with reference to FIGS. 25 through 40. In each of FIGS. 25 through 40, the optical pickup 24 and the drive motor 29 are omitted from illustration for the sake of brevity.

In an initial state prior to the insertion of the recording medium cartridge 100 into the holder 8, the engaging tooth 115*b* of the lock lever 115 of the recording medium cartridge 100 is engaged by the locking finger 108 in the mechanism housing region 106 of the case 101 (see FIG. 5), locking the shutter 110 in the closed position in which the opening and closing panel 111 closes the light transmission hole 101*h*.

Figure 25:
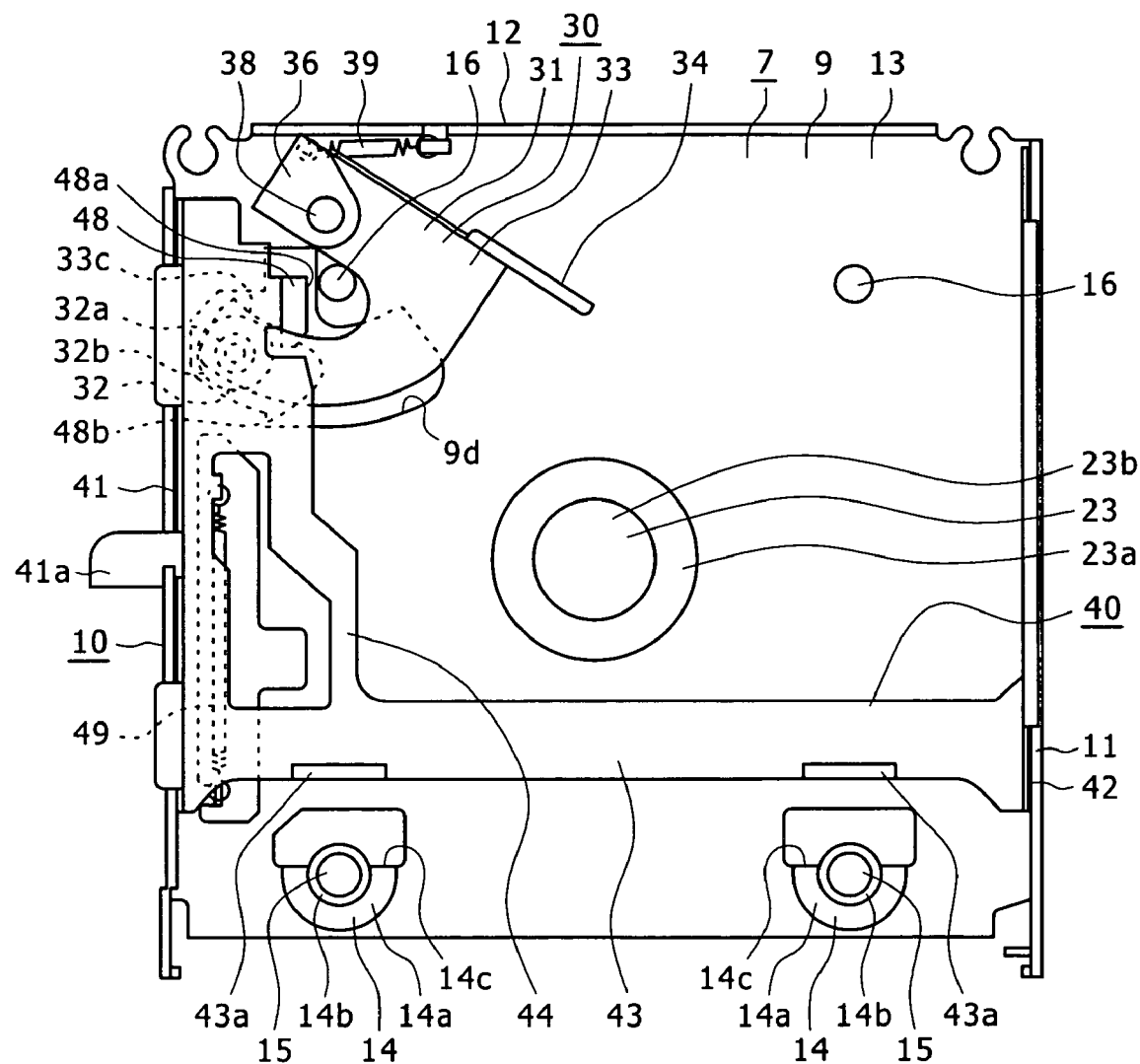
FIG. 25 is an enlarged plan view showing an initial state of the recording medium drive unit prior to the insertion of the recording medium cartridge into the holder, with the holder omitted from illustration.

In the initial state, the ejection lever 30 is positioned in an angular moving stroke end in the clockwise direction as viewed from above (see FIG. 25). The clockwise direction represents a second turning direction of the ejection lever 30, and the counterclockwise direction represents a first turning direction of the ejection lever 30. At this time, the acting surface member 34 of the ejection lever 30 is positioned so as to project obliquely forwardly to the right with respect to the slide surface member 33.

Figure 26:
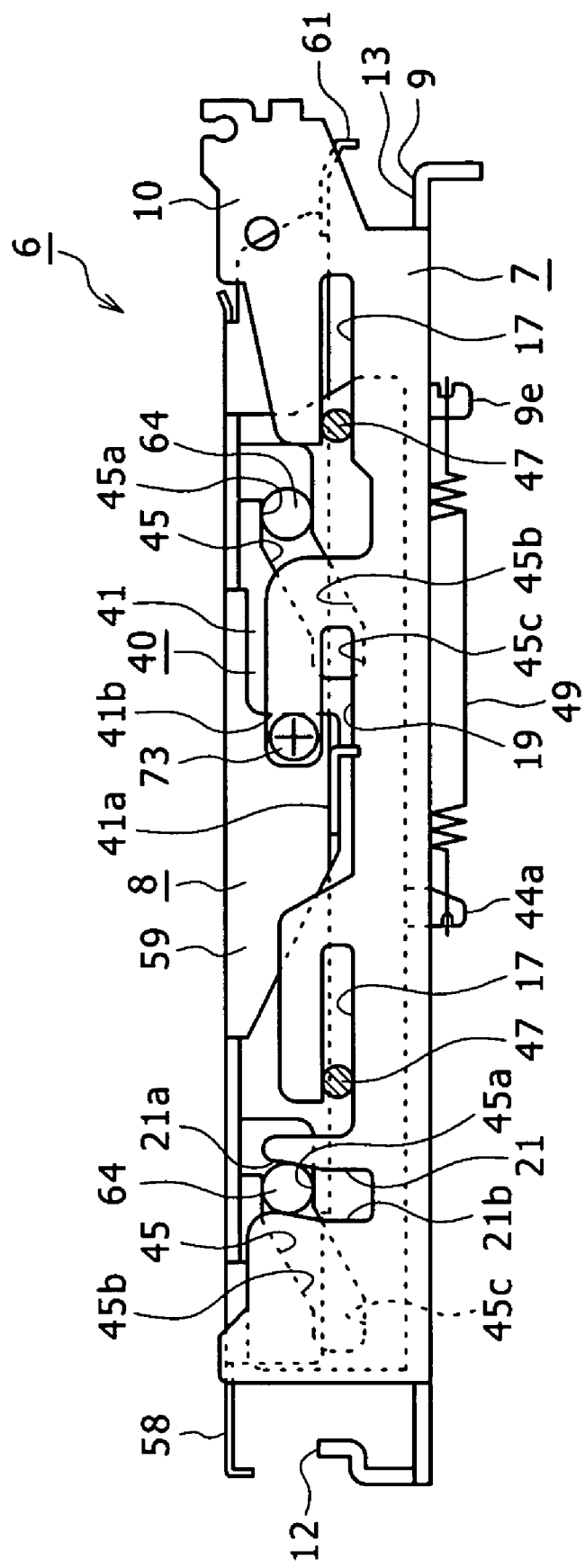
FIG. 26 is an enlarged side elevational view: showing the initial state of the recording medium drive unit prior to the insertion of the recording medium cartridge into the holder.
Figure 27:
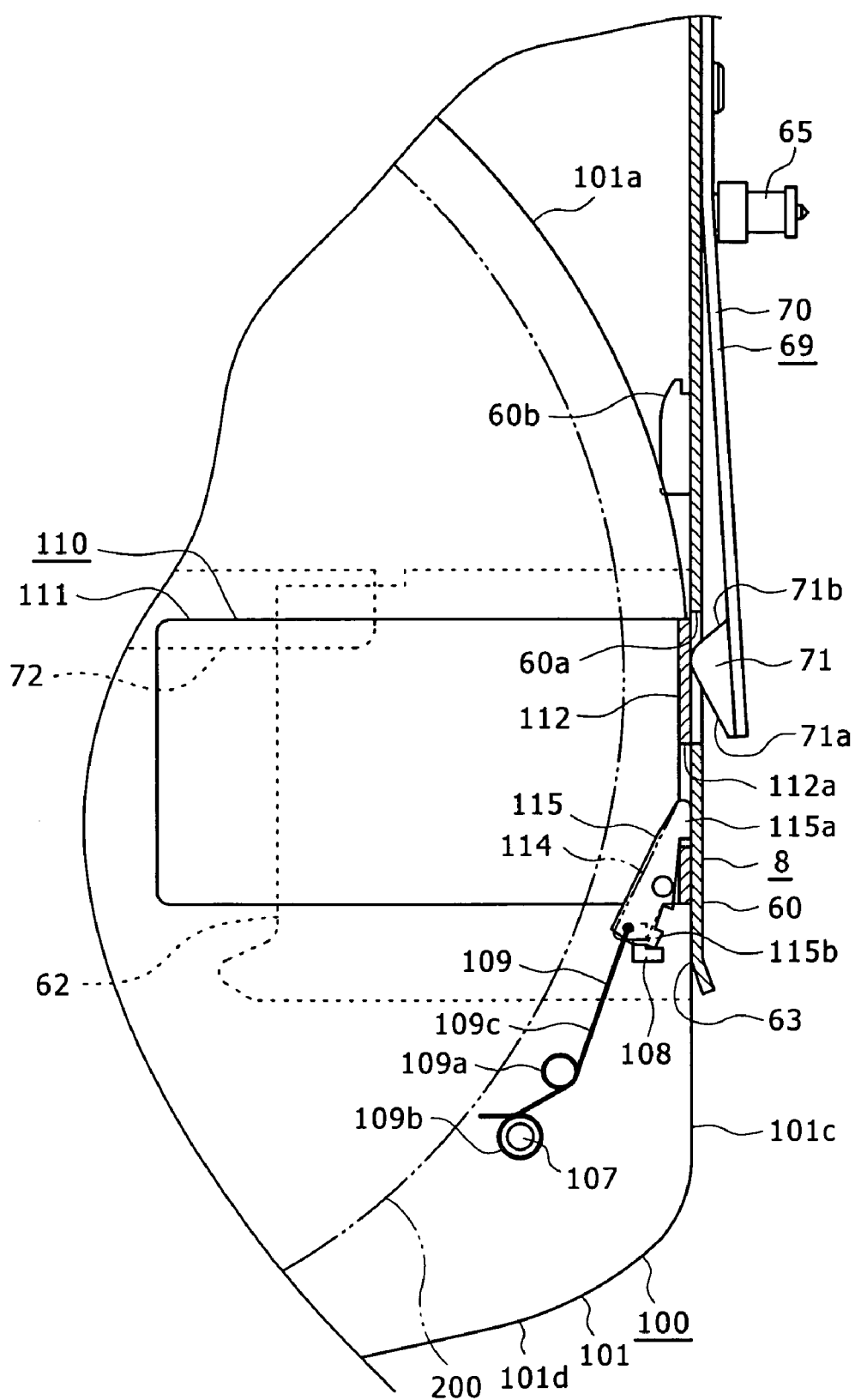
FIG. 27 is an enlarged plan view, partly in cross section, showing the manner in which the recording medium cartridge is inserted into the holder and an unlocking tooth of the shutter opening and closing spring rides on a shutter.

In the initial state, the ejection lever 40 is moved rearwardly, i.e., in the second sliding direction, with the support shafts 47 engaging in the respective rear ends of the slide support grooves 17 defined in the side walls 10, 11 of the chassis 7 (see FIG. 26). The first sliding direction of the ejection slider 40 represents a forward direction. At this time, the sliding edge 48*c* of the ejection slider 40 is held in contact with the rear contact edge 33*c* of the ejection lever 30, which prevents the ejection slider 40 from moving forwardly.

The front supported pins 64, 65 on the side walls 59, 60 of the holder 8 engage respectively in the upper horizontal segments 45*a* of the cam grooves 45 of the ejection slider 40, and the rear supported pins 64 on the side walls 59, 60 engage respectively in the upper horizontal segments 45*a* of the cam grooves 45 of the ejection slider 40 and respectively in the upper ends of the inclined portions 21*a* of the support grooves 21 of the chassis 7. Therefore, the holder 8 is in an upper stroke end, i.e., in a first position in which the recording medium cartridge 100 can be inserted and ejected. A lower stroke end of the holder 8 represents a second position.

When the holder 8 is in the first position, the dislodgment prevention member 72 attached to the holder 8 is positioned directly above the bridge 43 of the ejection slider 40.

When the recording medium cartridge 100 is inserted through the insertion slot 5 in the slot member 52, the recording medium cartridge 100 presses and turns the opening and closing cover 50 against the bias of the spring 51 as the recording medium cartridge 100 is inserted into the holder 8. Since the insertion slot 5 in the slot member 52 has the maximum width M at its center in the lateral direction and the curved edge 55*c* is positioned between the straight edges 55*b* of the second slot edge 55, as described above, the recording medium cartridge 100 is smoothly inserted into the holder 8.

When the recording medium cartridge 100 is progressively inserted into the holder 8, the shutter opening member 60*b* on the side wall 60 of the holder 8 is inserted into the insertion slot 105 of the recording medium cartridge 100. At this time, the unlocking tooth 71 of the shutter opening and closing spring 69 mounted on the side wall 60 rides onto the outer surface of the side wall 112 of the shutter 110, and slides against the side wall 112 (see FIG. 27). Therefore, the spring bar 70 of the shutter opening and closing spring 69 is elastically deformed.

Figure 28:
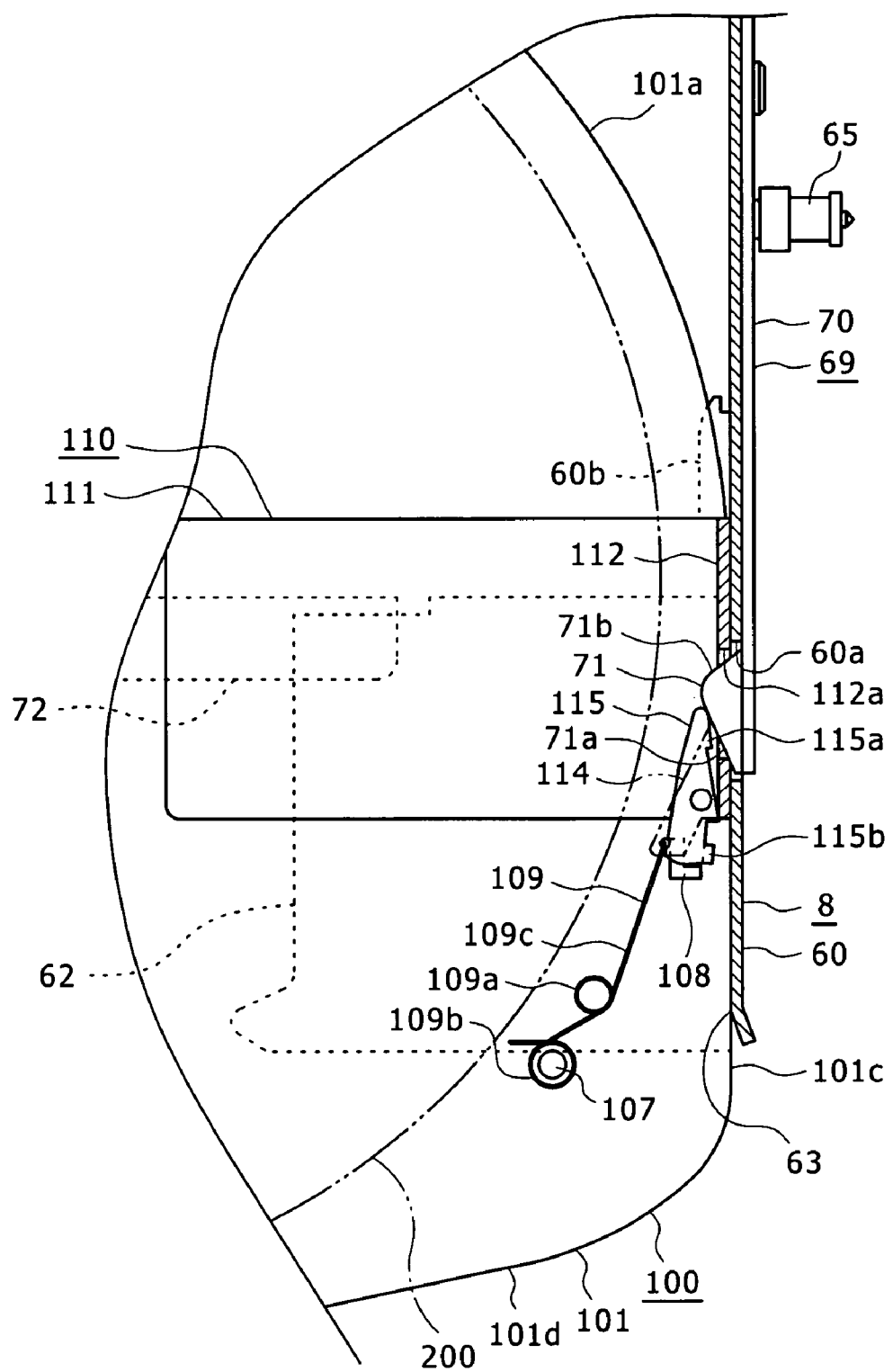
FIG. 28 is an enlarged plan view, partly in cross section, showing the manner in which the shutter is unlocked in a closed position thereof.

As the recording medium cartridge 100 is further inserted into the holder 8, the shutter opening member 60b is brought into contact with the rear edge of the side wall 112 of the shutter 110 (see FIG. 28). At the same time, the unlocking tooth 71 which has been placed on the side wall 112 of the shutter 110 snaps into the acting hole 112a when the spring bar 70 springs back against the side wall 60.

When the unlocking tooth 71 is inserted into the acting hole 112a, the unlocking tooth 71 presses the pressed member 115a of the lock lever 115, turning the lock lever 115 against the bias of the non-illustrated spring. Therefore, the engaging tooth 115b disengages from the locking finger 108, unlocking the shutter 110 from the closed position.

Figure 29:
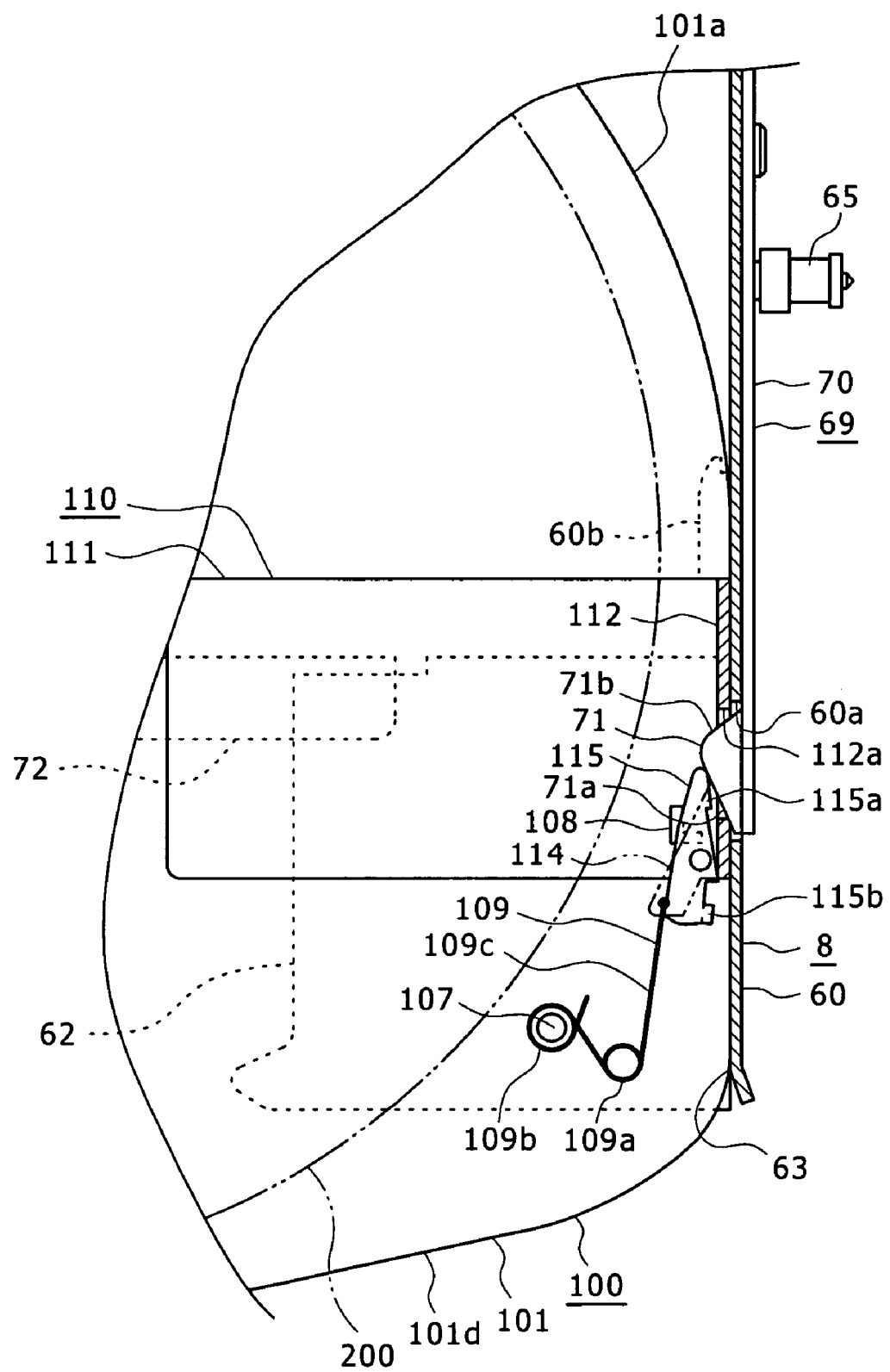
FIG. 29 is an enlarged plan view, partly in cross section, showing the manner in which the shutter is being opened.
Figure 30:
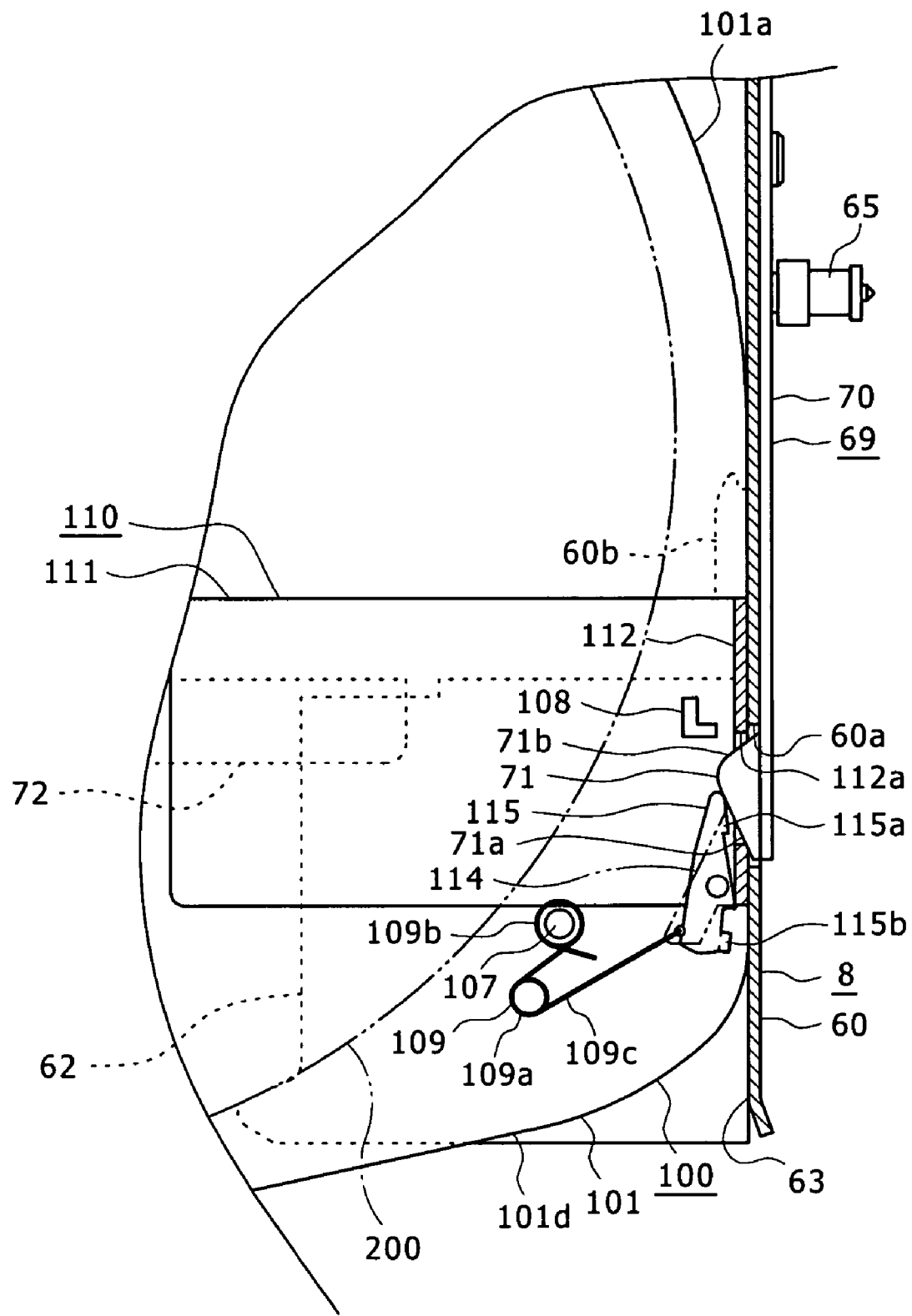
FIG. 30 is an enlarged plan view, partly in cross section, showing the manner in which the shutter is moved to an open position thereof.

With the shutter 110 unlocked from the closed position, since the shutter opening member 60b is in contact with the rear edge of the side wall 112, further insertion of the recording medium cartridge 100 into the holder 8 moves the shutter 110 relatively forwardly with respect to the case 101, thereby opening the shutter 110 (see FIG. 29).

When the insertion of the recording medium cartridge 100 into the holder 8 is finished, the shutter 110 has been moved to the open position. As described above, the shutter 110 is urged by the toggle spring 109 in a direction opposite to the direction in which the recording medium cartridge 100 has been inserted, holding the shutter 110 in the open position (see FIG. 30).

Figure 31:
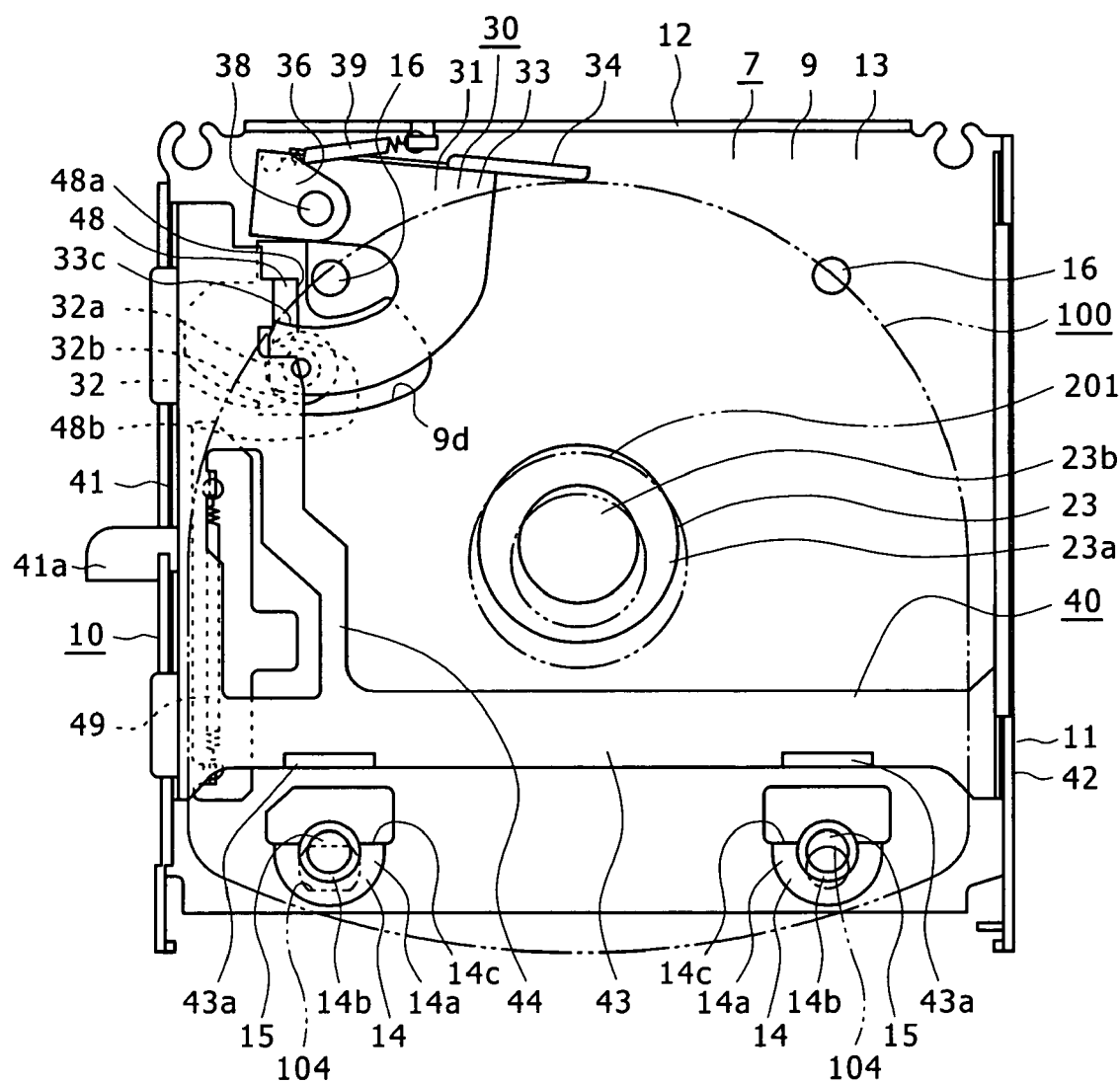
FIG. 31 is an enlarged plan view showing the manner in which the recording medium cartridge is inserted into the holder and the ejection lever is turned, with the holder omitted from illustration.

When the recording medium cartridge 100 is inserted into the holder 8, at the same time that the shutter 110 is opened, the recording medium cartridge 100 presses the acting surface member 34 of the ejection. lever 30, turning the ejection lever 30 in the first turning direction, i.e., counterclockwise as viewed from a above, against the bias of the urging spring 39 (see FIG. 31). When the ejection lever 30 is turned in the first turning direction, the sliding edge 48c of the ejection slider 40 slides against the rear contact edge 33c of the ejection lever 30.

Figure 32:
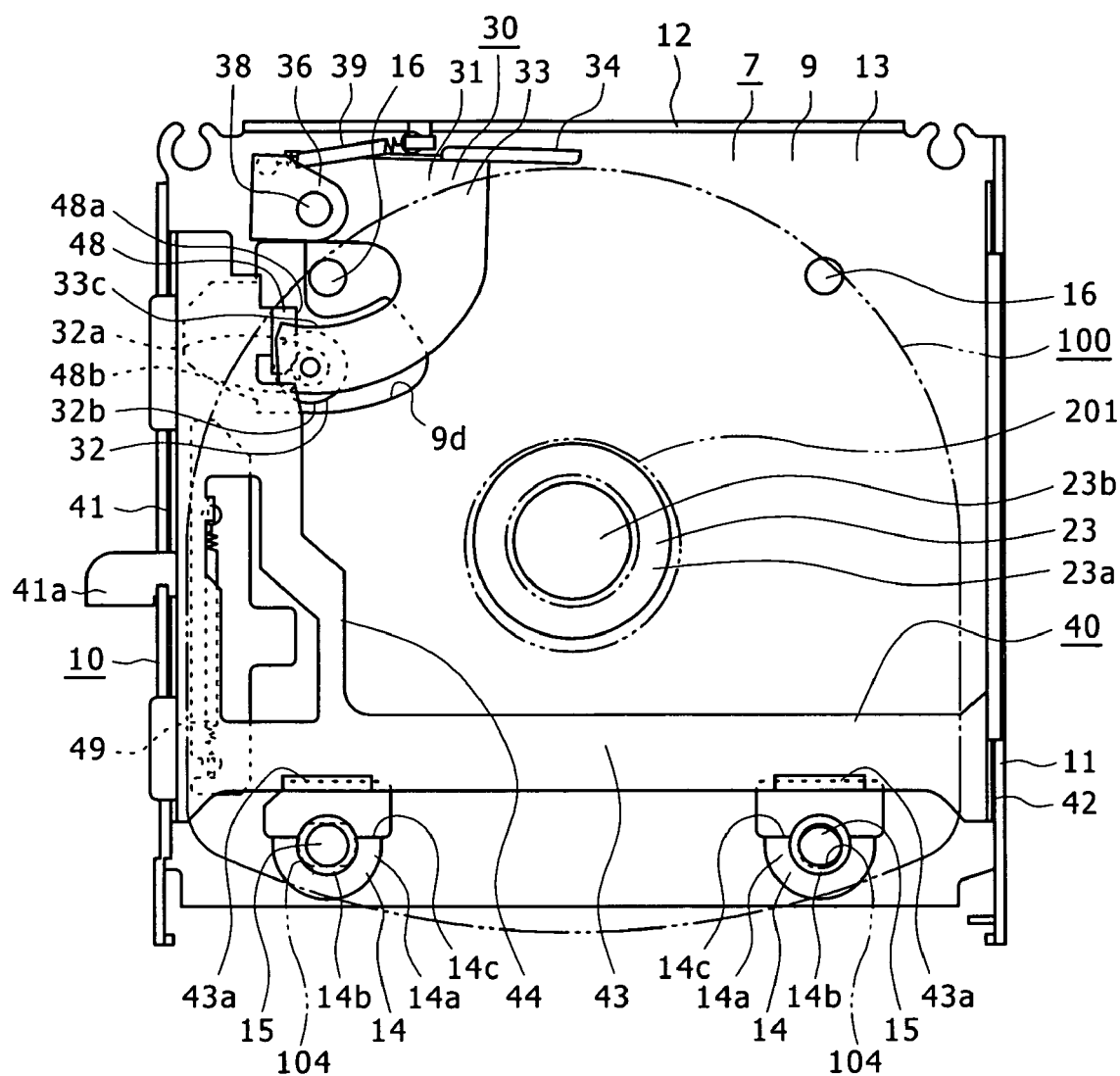
FIG. 32 is an enlarged plan view showing the manner in which the ejection slider is moved forwardly, with the holder omitted from illustration.
Figure 33:
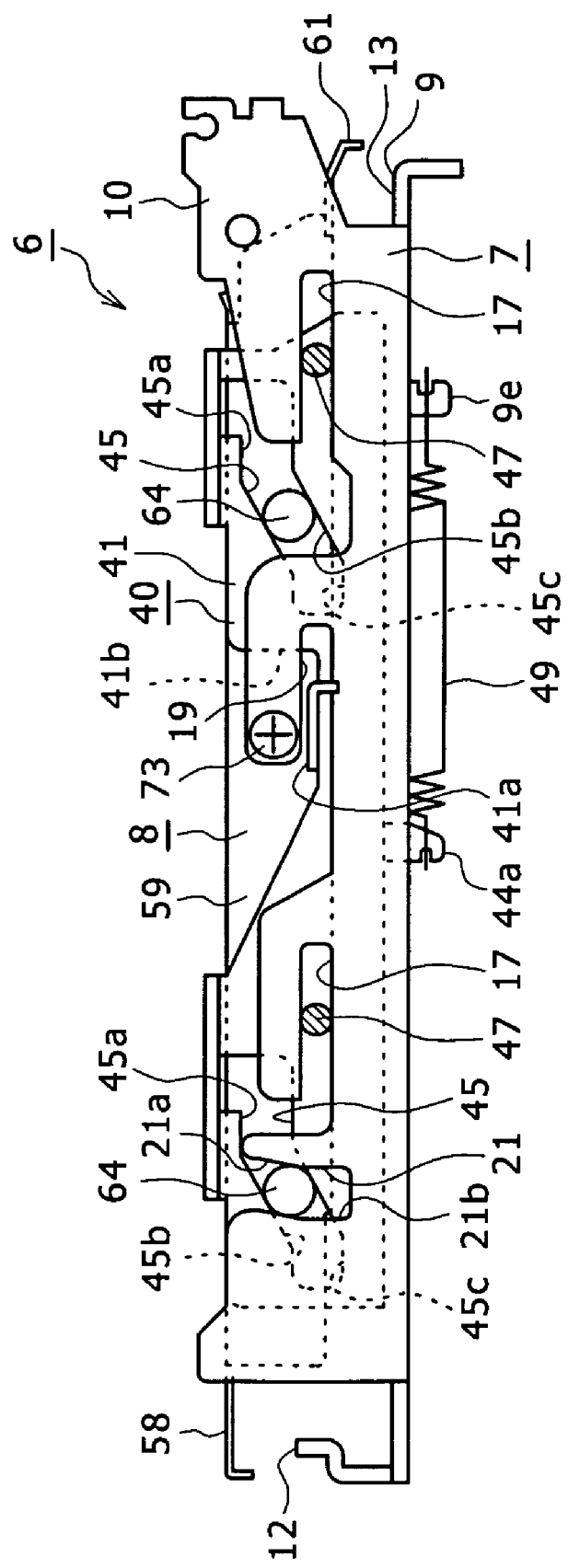
FIG. 33 is an enlarged side elevational view showing the manner in which the holder is being lowered.
Figure 34:
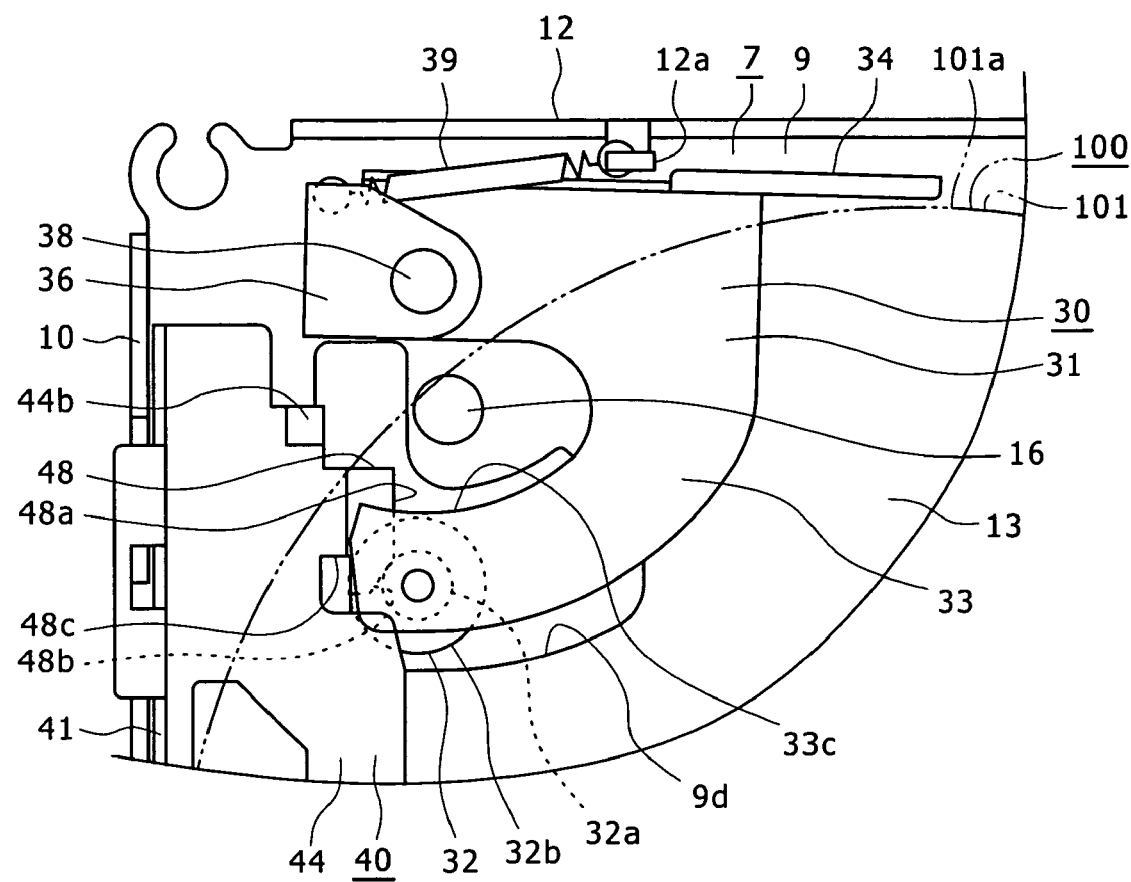
FIG. 34 is an enlarged fragmentary plan view showing the manner in which an acting edge of a sliding engagement member of the ejection slider is held in contact with a shaft of a sliding contact engagement member of the ejection lever.

When the ejection lever 30 is further turned in the first turning direction, the sliding edge 48c of the ejection slider 40 is brought out of sliding contact with the rear contact edge 33c of the ejection lever 30, and the ejection slider 40 is moved forwardly under the bias of the helical spring 49 (see FIG. 32). At this time, the recording medium cartridge 100 is inserted to a predetermined position in the holder 8, and the opening and closing cover 50 is turned against the bias of the spring 51 and is obliquely held in resilient contact with the upper surface of the case 101 of the recording medium cartridge 100.

Upon forward movement of the ejection slider 40, the supported pins 64, 65 of the holder 8 are displaced from the upper horizontal segments 45a of the cam grooves 45 of the ejection slider 40 toward the slanted segments 45b thereof. At this time, the rear supported pins 64 move in the inclined portions 21a of the support grooves 21 of the chassis 7 (see FIG. 33). Therefore, the holder 8 is lowered as it is moved rearwardly while holding the recording medium cartridge 100.

When the holder 8 is moved, the supported pins 64, 65 are rotated with respect to the side plates 41, 42 of the ejection slider 40. Therefore, the holder 8 is smoothly moved.

When the sliding edge 48c of the ejection slider 40 and the rear contact edge 33c of the ejection lever 30 are brought out of contact with each other, the ejection slider 40 is moved forwardly under the bias of the helical spring 49. Upon forward movement of the ejection slider 40, the acting edge 48b of the sliding engagement member 48 contacts the shank 32a of the sliding contact engagement member 32 of the ejection lever 30 and rotates the shank 32a (see FIG. 34).

Since the sliding edge 48c is inclined to the direction in which the ejection slider 40 is moved, as the ejection slider 40 is moved forwardly, the ejection lever 30 is turned in the first turning direction against the bias of the urging spring 39. Therefore, the acting surface member 34 of the ejection lever 30 is spaced rearwardly from the recording medium cartridge 100. When the recording medium cartridge 100 is lowered upon downward movement of the holder 8, the case 101 of the recording medium cartridge 100 and the acting surface member 34 are kept out of contact with each other. The case 101 is thus prevented from being damaged, and the holder 8 and the recording medium cartridge 100 are smoothly lowered.

In the recording medium drive unit 6, as described above, the support grooves 21 for vertically moving the holder 8 have the inclined portions 21a. Consequently, the upper horizontal segments 45a of the cam grooves 45 can be positioned more forwardly than if the support grooves have only vertically extending segments. The ejection slider 40 can thus be positioned forwardly with respect to the chassis 7.

With the ejection slider 40 being thus positioned forwardly, the stroke end of the ejection lever 30 in the second turning direction is positioned forwardly, allowing the sliding edge 48c of the ejection slider 40 and the rear contact edge 33c of the ejection lever 30 to be brought out of contact with each other at a forward position. Therefore, when the recording medium cartridge 100 is inserted into the holder 8, the distance that the recording medium cartridge 100 is pushed in by the user's finger may be small, and the recording medium cartridge 100 may be inserted quickly into the holder 8.

Figure 35:
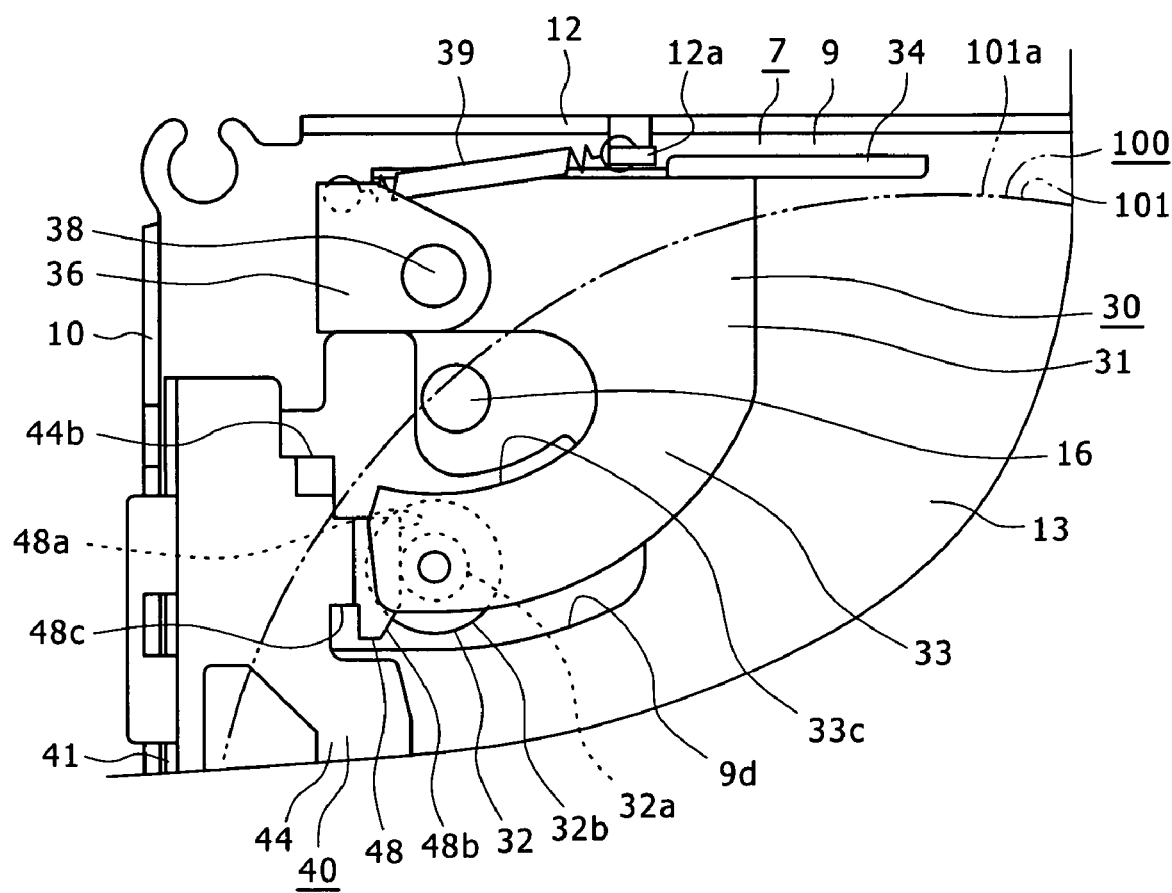
FIG. 35 is an enlarged fragmentary plan view showing the manner in which a holding edge of the sliding engagement member of the ejection slider is held in contact with the shaft of the sliding contact engagement member of the ejection lever.
Figure 36:
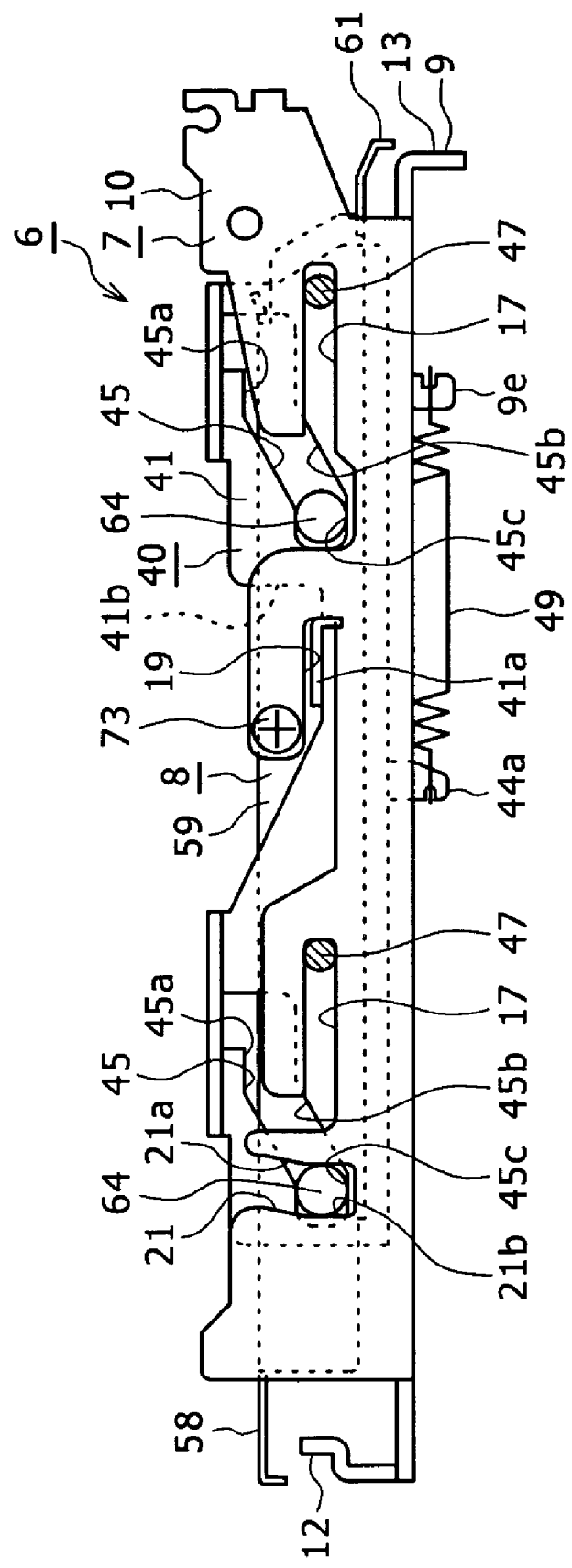
FIG. 36 is an enlarged side elevational view showing the manner in which the holder is lowered.
Figure 37:
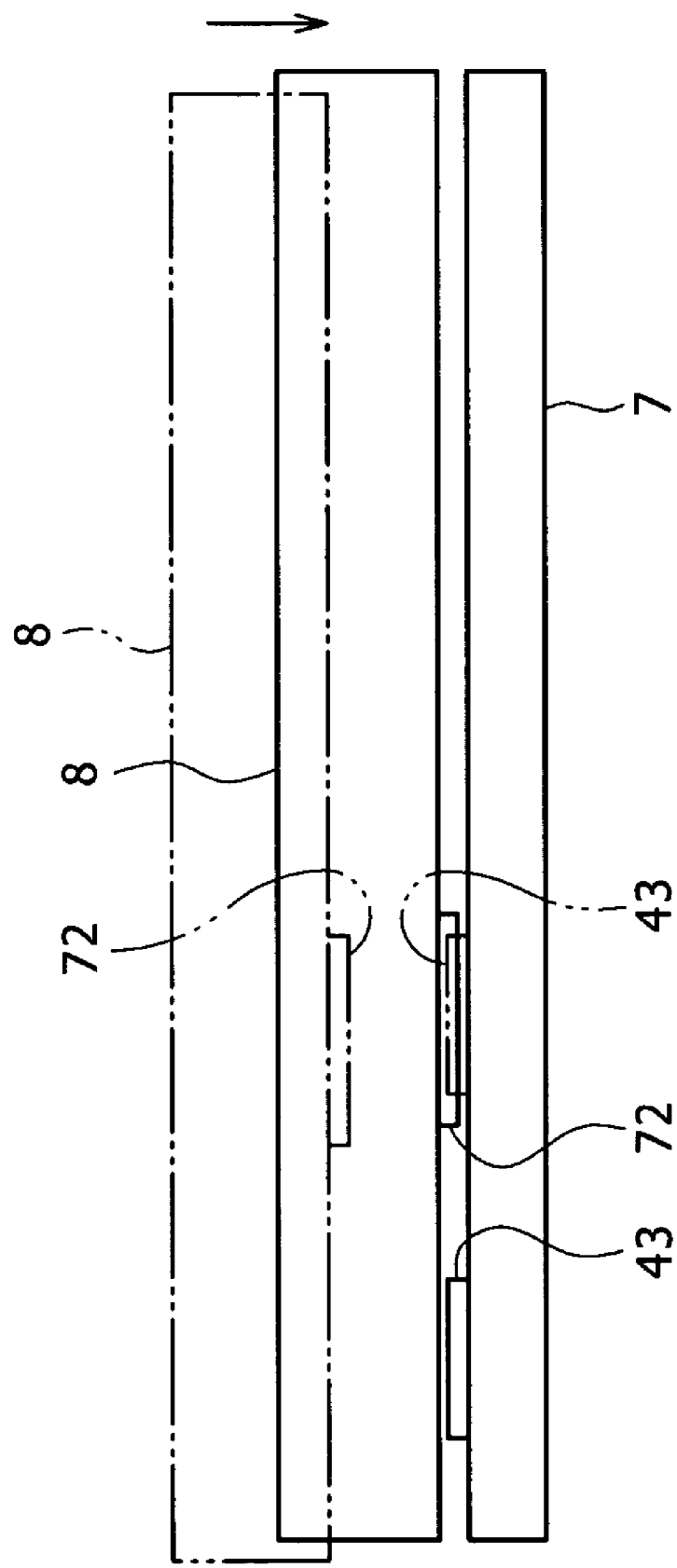
FIG. 37 is a conceptual view showing the positional relationship between a bridge of the ejection slider and an expulsion prevention member mounted on the holder.

Upon forward movement of the ejection slider 40, the holding edge 48a of the sliding engagement member 48 is brought into contact with the shank 32a of the sliding contact engagement member 32 of the ejection lever 30 and rotates the shank 32a (see FIG. 35). Therefore, the ejection lever 30 is held in the angular moving stroke end in the first turning direction.

As described above, when the ejection slider 40 is moved, the holding edge 48a of the sliding engagement member 48 is brought into contact with the shank 32a of the sliding contact engagement member 32 and rotates the shank 32a. Therefore, any frictional forces between the sliding engagement member 48 and the sliding contact engagement member 32 are small, preventing the sliding engagement member 48 and the sliding contact engagement member 32 from being unduly worn and allowing the ejection lever 30 and the ejection slider 40 to operate smoothly.

The sliding contact engagement member 32 has the flange 32b that is greater in diameter than the shank 32a. Therefore, the sliding engagement member 48 is prevented from being dislodged from the shank 32a, allowing the ejection lever 30 and the ejection slider 40 to operate reliably.

The forward movement of the ejection slider 40 moves the supported pins 64, 65 of the holder 8 from the slanted segments 45b of the cam grooves 45 of the ejection slider 40 to the lower horizontal segments 45c thereof. (see FIG. 36). At this time, the rear supported pins 64 are moved from the inclined portions 21a of the support grooves 21 of the chassis 7 into the straight portions 21b thereof. Accordingly, the holder 8 which is holding the recording medium cartridge 100 is moved straight downwardly.

The ejection slider 40 is moved to the forward stroke end, and the holder 8 is moved to the lower stroke end, reaching the second position. At this time, the bridge 43 of the ejection slider 40 is moved forwardly over the flat panel 13 of the chassis 7, and the dislodgment prevention member 72 attached to the holder 8 is positioned behind the bridge 43 (see FIG. 37). Therefore, because the bridge 43 and the dislodgment prevention member 72 do not vertically overlap each other, the recording medium drive unit 6 may be made lower in profile.

Figure 38:
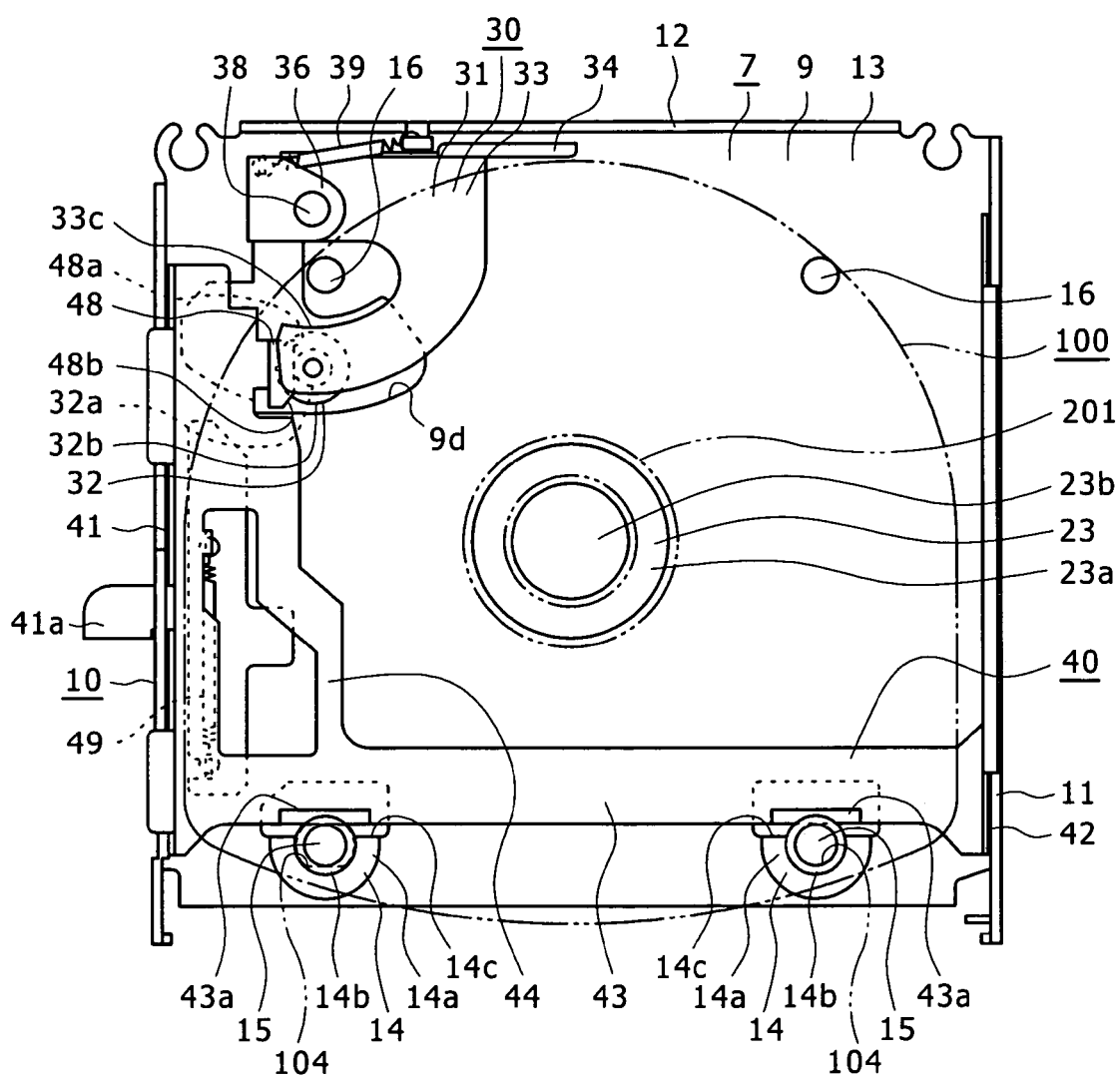
FIG. 38 is an enlarged plan view showing the manner in which the ejection slider is moved to a front stroke end and a portion of the bridge is inserted in an insertion recess in the chassis.
Figure 39:
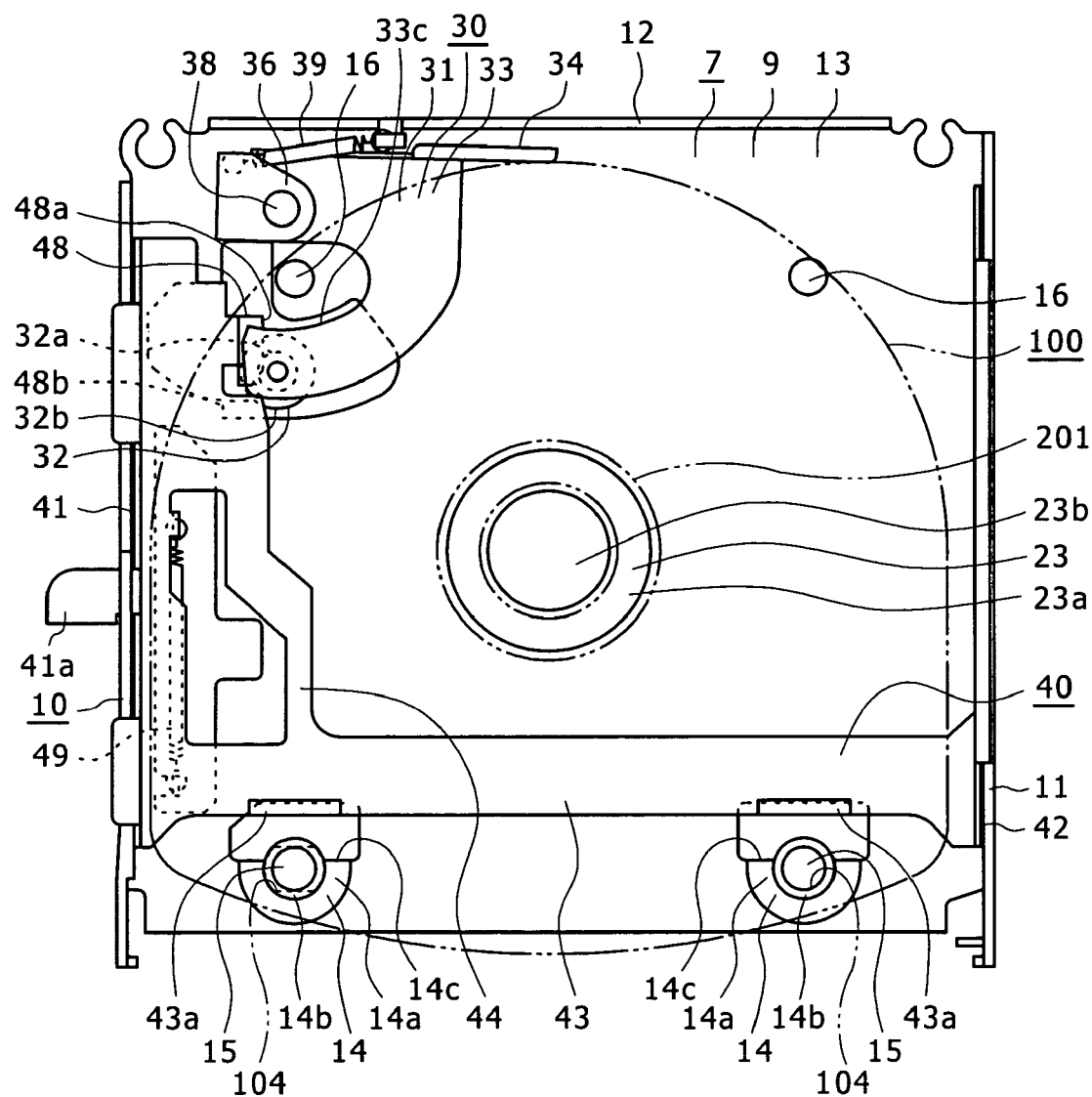
FIG. 39 is an enlarged plan view showing the manner in which the ejection lever is turned and the recording medium cartridge is ejected from the holder, with the holder omitted from illustration.
Figure 40:
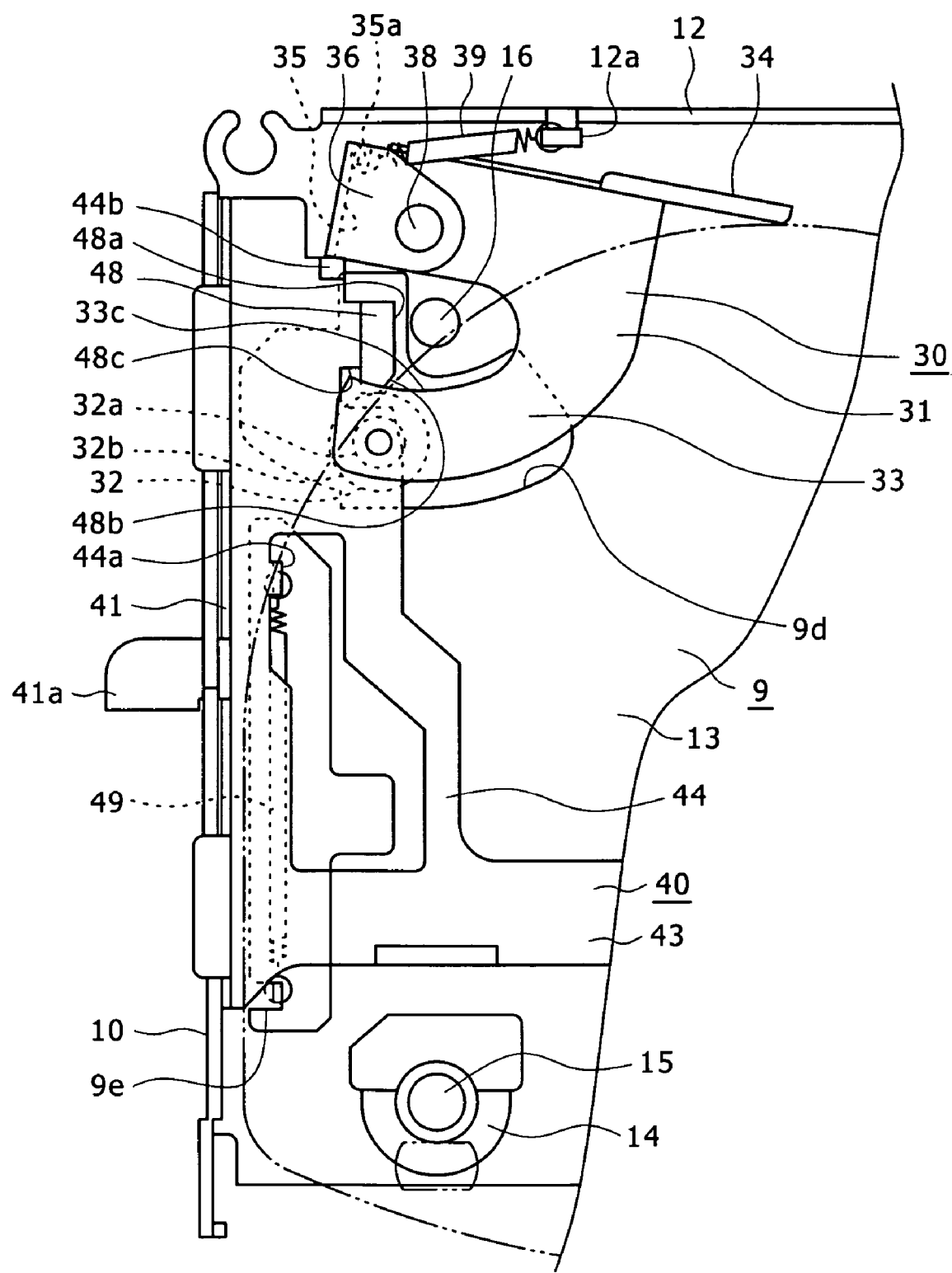
FIG. 40 is an enlarged fragmentary plan view showing the manner in which the ejection lever is forcibly turned by being pressed by an assistive presser of the ejection slider.

When the ejection slider 40 is moved to the forward stroke end, the thin portions 43a of the bridge 43 are inserted into the respective insertion recesses 14c of the chassis 7 (see FIG. 38). The distance that the bridge 43 is partly inserted into the insertion recesses 14c results in an increase in the moving stroke of the ejection slider 40.

The distance that the bridge 43 is partly inserted into the insertion recesses 14c also makes it possible to increase the width of the ejection slider 40 in the anteroposterior direction and hence to increase the rigidity of the ejection slider 40. In addition to the increased mechanical strength of the ejection slider 40, the operational reliability of the ejection slider 40 for synchronized movement of the side plates 41, 42 is also increased.

As the thin portions 43a of the bridge 43 are inserted into the respective insertion recesses 14c of the chassis 7, the height of the pin placement regions 14 of the chassis 7 is reduced to make the recording medium drive unit 6 lower in profile.

When the holder 8 is moved to the second position at the downward stroke end, the positioning pins 15 on the chassis 7 are inserted respectively into the positioning holes 104 in the case 101. At this time, the disk table 23 is inserted into the table insertion hole 101f in the case 101. The core 201 of the recording medium 200 is attracted to the magnet on the centering land 23b, whereupon the recording medium 200 is mounted on the disk table 23.

The case 101 of the recording medium cartridge 100 is pressed toward the chassis 7 by the presser springs 58b disposed on the joint surface member 58 of the holder 8. The lower surface of the case 101 is supported on the rests 14b of the pin placement regions 14 and the bearing protrusions 16 of the chassis 7.

The recording medium 200 mounted on the disk table 23 is rotated by the disk table 23, and an information signal is recorded on and/or reproduced from the recording medium 200 by the optical pickup 24.

When the information signal has been recorded on and/or reproduced from the recording medium 200 by the optical pickup 24, and the operating bar 41a is moved rearwardly, the recording medium cartridge 100 starts being ejected.

When operating bar 41a is moved rearwardly, the ejection slider 40 is moved rearwardly, and the supported pins 64, 65 of the holder 8 are moved from the lower support segments 45c of the cam grooves 45 of the ejection slider 40 through the slanted segments 45b into the upper horizontal segments 45a. At this time, the rear supported pins 64 are moved from the straight portions 21b of the support grooves 21 of the chassis 7 to the upper ends of the inclined portions 21a. Therefore, the holder 8 is elevated while holding the recording medium cartridge 100.

The holding edge 48a and then the acting edge 48b of the sliding engagement member 48 of the ejection slider 40 are successively brought into contact with the shank 32a of the sliding contact engagement member 32, rotating the shank 32a. The rotation of the shank 32a allows the ejection lever 30 and the ejection slider 40 to operate smoothly.

As the holder 8 is moved upwardly, the recording medium cartridge 100 is lifted to dismount the recording medium 200 from the disk table 23.

When the ejection slider 40 is moved to a predetermined rear position, the holding edge 48a and the acting edge 48b of the sliding engagement member 48 of the ejection slider 40 are brought out of contact with the shank 32a of the sliding contact engagement member 32. The ejection lever 30 is turned in the second turning direction under the bias of the urging spring 39 (see FIG. 39). Therefore, the recording medium cartridge 100 is pressed forwardly by the acting surface member 34 of the ejection lever 30, and partly projects forwardly from the insertion slot 5.

For ejecting the recording medium cartridge 100, as described above, the rear supported pins 64 are moved in the inclined portions 21a of the support grooves 21 of the chassis 7. Accordingly, the holder 8 is elevated while it is moving forwardly. The distance that the holder 8 is moved forwardly results in an increase in the distance that the recording medium cartridge 100 projects from the holder 8. Therefore, the user can easily grip the projecting portion of the recording medium cartridge 100 and hence can easily remove the recording medium cartridge 100 from the holder 8.

When the ejection slider 40 is moved to the front stroke end, the sliding edge 48c of the ejection slider 40 is brought into contact with the rear contact edge 33c of the ejection lever 30. The ejection slider 40 is held at the front stroke end and the ejection lever 30 is held at the angular moving stroke end in the second turning direction.

When the ejection slider 40 is moved rearwardly, if large frictional forces act between the ejection lever 30 and the chassis 7 are large, then the ejection lever 30 may possibly fail to be turned in the second turning direction. Even in this case, the assistive presser 44b of the ejection slider 40 presses the support protrusion 35 of the ejection lever 30 rearwardly, forcing the ejection lever 30 to be turned in the second turning direction (see FIG. 40). Therefore, upon turning movement of the ejection lever 30, the recording medium cartridge 100 is pressed by the acting surface member 34 and projects forwardly from the insertion slot 5.

In the recording medium drive unit 6, as described above, even if the ejection lever 30 is not turned upon rearward movement of the ejection slider 40, the support protrusion 35 of the ejection lever 30 is pressed by the assistive presser 44b of the ejection slider 40 to forcibly turn the ejection lever 30 in the second turning direction. Therefore, the recording medium cartridge 100 can reliably be ejected from the holder 8.

The biasing force of the urging spring 39 does not need to be increased for increasing the operational reliability of the ejection lever 30. Consequently, the user does not need to apply large forces to press the recording medium cartridge 100 against the biasing force of the urging spring for inserting the recording medium cartridge 100 into the holder 8. The recording medium cartridge 100 can thus be inserted into the holder 8 smoothly and quickly.

In the ejecting process described above, since the unlocking tooth 71 of the shutter opening and closing spring 69 is inserted in the acting hole 112a of the shutter 110 of the recording medium cartridge 100, when the recording medium cartridge 100 projects forwardly from the holder 8, the case 101 is moved forwardly with respect to the shutter 110, which is relatively moved rearwardly with respect to the case 101 and is closed.

The user grips and pulls out the portion of the recording medium cartridge 100 which is projecting from the holder 8, thereby removing the recording medium cartridge 100 from the holder 8. At this time, the unlocking tooth 71 of the shutter opening and closing spring 69 is displaced out of the acting hole 112a, allowing the lock lever 115 to turn under the bias of the urging spring. The engaging tooth 115b is engaged by the locking finger 108, locking the shutter 110 in the closed position.

When the recording medium cartridge 100 is removed from the holder 8, the opening and closing cover 50 is turned under the bias of the spring 51 and closes the insertion slot 5 in the slot member 52. The opening and closing cover 50 prevents dust particles from entering from the insertion slot 5 into the electronic device 1.

Figure 41:
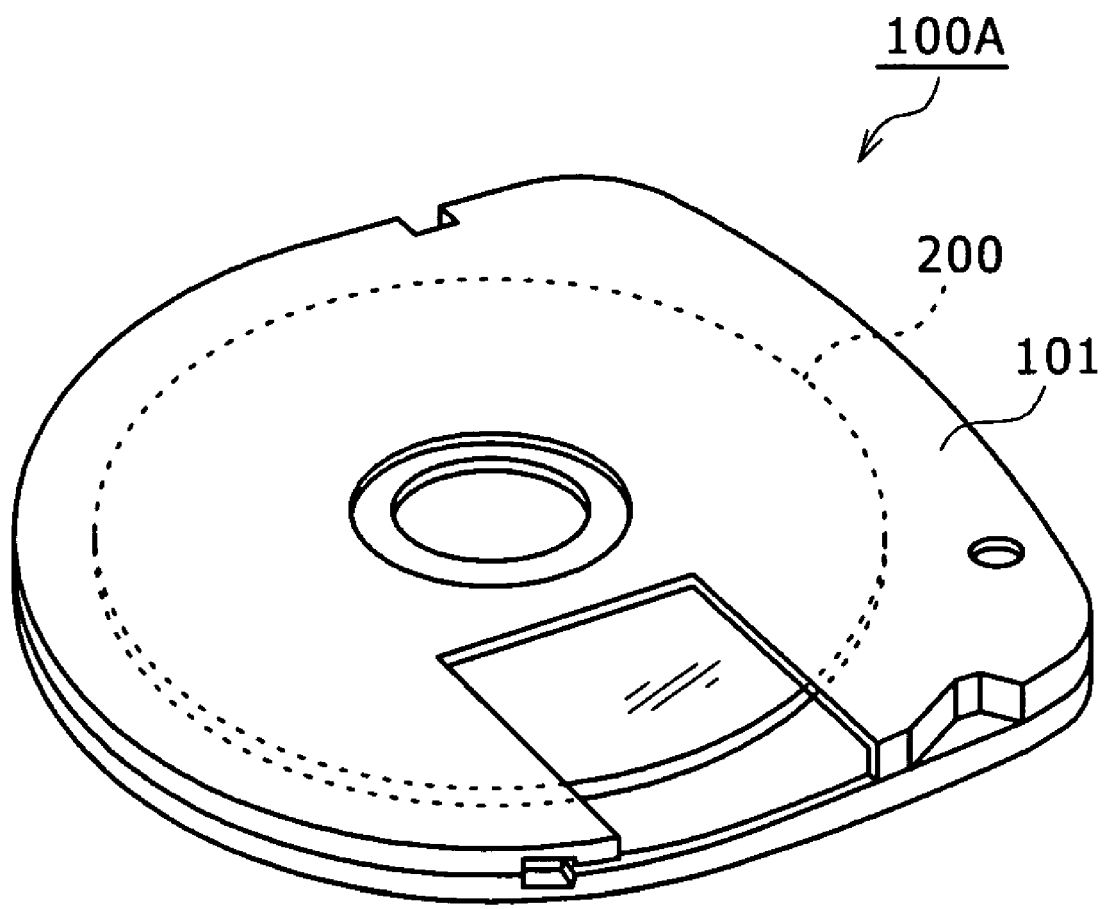
FIG. 41 is an enlarged perspective view of a recording medium cartridge which is free of a shutter.

The recording medium cartridge 100 with the shutter 110 has been described above as the recording medium cartridge according to the present invention. However, the recording medium cartridge according to the present invention is not limited to the recording medium cartridge 100 with the shutter 110, but may be a recording medium cartridge 100A which is free of the shutter 110, as shown in FIG. 41.

An overall system arrangement of the electronic device 1 will be described below with reference to FIG. 42.

Figure 42:
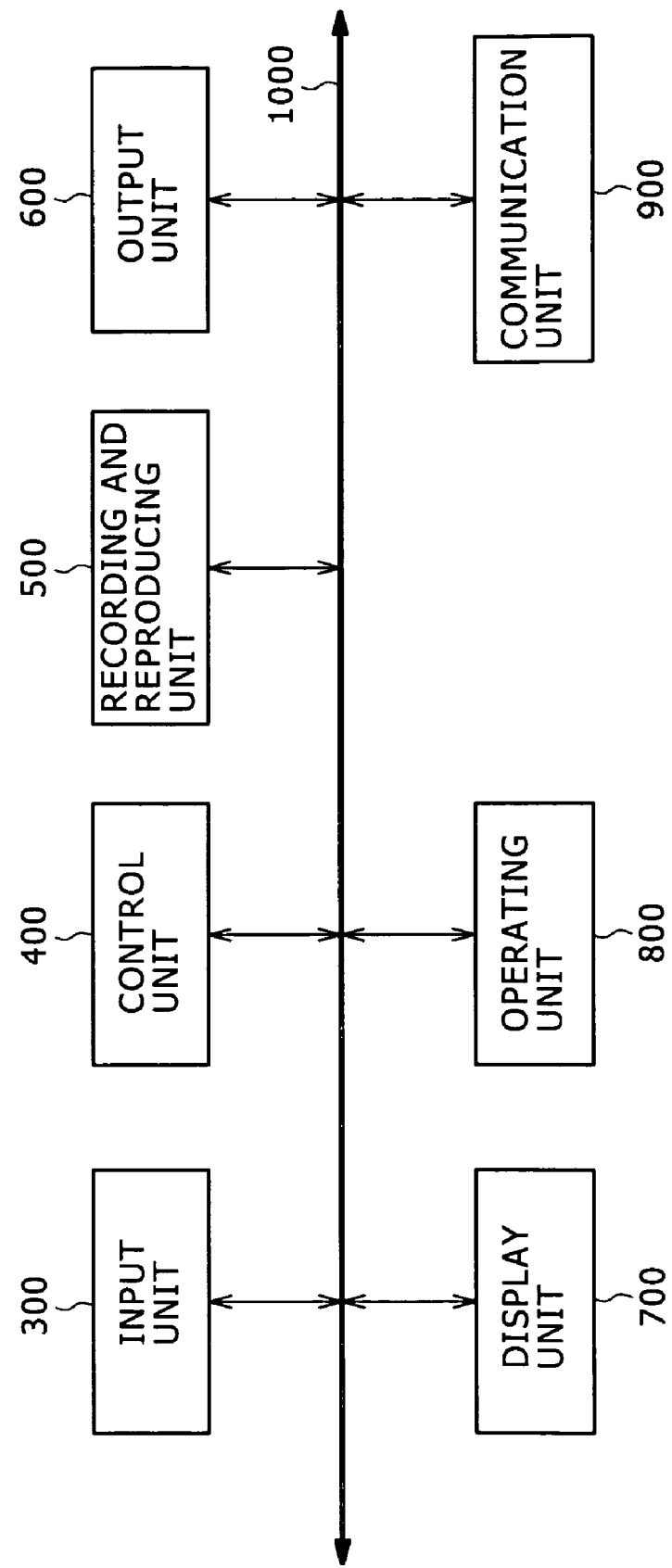
FIG. 42 is a block diagram of an overall system arrangement of the electronic device.

As shown in FIG. 42, the electronic device 1 comprises an input unit 300, a control unit 400, a recording and reproducing unit 500, an output unit 600, a display unit 700, an operating unit 800, and a communication unit 900 which are interconnected through a bus 1000.

The input unit 300 enters data such as image data or audio data. If data to be entered is image data, then the input unit 300 comprises a camera, for example. If data to be entered is audio data, then the input unit 300 comprises a microphone, for example.

The control unit 400 has a function to control the electronic device 1 in its entirety.

The recording and reproducing unit 500 functions to record an information signal on and reproduce an information signal from the recording medium 200 in the recording medium cartridge 100 or 100A. The recording and reproducing unit 500 includes the optical pickup 24 referred to above. The recording and reproducing unit 500 also records data entered through the input unit 300 and data entered through the communication unit 900 on the recording medium 200.

The output unit 600 outputs data recorded on the recording medium 200 and reproduced by the recording and reproducing unit 500. If data to be output is audio data, then the output unit 600 comprises a speaker.

The display unit 700 displays data recorded on the recording medium 200 and reproduced by the recording and reproducing unit 500 and data entered through the input unit 300. The display unit 700 includes the display unit 3 referred to above.

The operating unit 800 outputs command signals for controlling the input unit 300, the recording and reproducing unit 500, the output unit 600, and the display unit 700 to the control unit 400. The operating unit 800 includes the control keys 4 referred to above.

The communication unit 900 sends a video signal and an audio signal to and receives a video signal and an audio signal from an external drive unit, an external connecting unit, etc.

Although a certain preferred embodiment of the present invention has been shown and described in detail, it should be understood that various changes and modifications may be made therein without departing from the scope of the appended claims.

What is claimed is:

1. A cartridge device comprising:
a recording and reproducing unit for recording an information signal on and/or reproducing an information signal from a recording medium stored in a case of a recording medium cartridge, said case having a positioning hole;
a holder for holding said recording medium cartridge inserted therein, said holder being movable between a first position in which said recording medium cartridge can be inserted into and removed from said holder and a second position in which an information signal can be recorded on or reproduced from the recording medium by said recording and reproducing unit;
a chassis having a base on which said recording and reproducing unit is mounted and a projection projecting from said base toward said holder for being inserted in said positioning hole, said holder being movably supported on said chassis for movement between said first position and said second position; and
an ejection slider slidably supported on said chassis for sliding movement selectively in a first sliding direction to move said holder from said first position to said second position and a second sliding direction, which is opposite to said first sliding direction, to move said holder from said second position to said first position; wherein
said projection has a recess defined therein, in which said ejection slider has a portion insertable into said recess when said election slider is moved in said first sliding direction.

2. The cartridge device according to claim 1, wherein
said chassis has a pair of side walls projecting from respective opposite side edges of said base in a direction transverse to said base,
said ejection slider has a pair of side plates slidable against said side walls, respectively, and a bridge interconnecting said side plates, said bridge being slidable against said base; and
when said ejection slider is moved in said first sliding direction, at least a portion of said bridge is inserted into said recess.

3. The cartridge device according to claim 2, wherein said portion of said bridge comprises a thin portion which is thinner than the remaining portion of said bridge, said thin portion being inserted into said recess.

4. The cartridge device according to claim 1, further comprising:
an insertion slot for inserting said recording medium cartridge therein; wherein
said projection is disposed near said insertion slot; and
when said ejection slider is moved toward said insertion slot, said portion of said ejection slider is inserted into said recess.

5. The cartridge device according to claim 1, wherein said projection comprises two projections mounted on said chassis.

* * * * *